United States Patent
Shimazu et al.

(10) Patent No.: US 12,084,142 B2
(45) Date of Patent: Sep. 10, 2024

(54) HUB FOR HUMAN-POWERED VEHICLE

(71) Applicant: Shimano Inc., Osaka (JP)

(72) Inventors: Hayato Shimazu, Osaka (JP); Takashi Komemushi, Osaka (JP); Kei Asao, Osaka (JP); Kiichiro Nagata, Osaka (JP)

(73) Assignee: Shimano Inc., Osaka (JP)

( * ) Notice: Subject to any disclaimer, the term of this patent is extended or adjusted under 35 U.S.C. 154(b) by 318 days.

(21) Appl. No.: 17/588,834

(22) Filed: Jan. 31, 2022

(65) Prior Publication Data

US 2023/0242199 A1   Aug. 3, 2023

(51) Int. Cl.
*H02K 7/18* (2006.01)
*B60B 27/02* (2006.01)
*B62J 6/12* (2006.01)
*B62J 43/30* (2020.01)
*B62J 45/412* (2020.01)
*B62J 45/414* (2020.01)
*B62J 45/423* (2020.01)

(52) U.S. Cl.
CPC ............... *B62J 6/12* (2013.01); *B60B 27/023* (2013.01); *B62J 43/30* (2020.02); *B62J 45/412* (2020.02); *B62J 45/414* (2020.02); *B62J 45/423* (2020.02); *H02K 7/1861* (2013.01)

(58) Field of Classification Search
CPC ............ B60B 27/0047; B60B 27/0068; B60B 27/0005; B60B 27/026; B60B 27/023; B62M 6/50; B62M 6/65; B62M 6/55; B62M 9/122
See application file for complete search history.

(56) References Cited

U.S. PATENT DOCUMENTS

| | | | |
|---|---|---|---|
| 6,573,686 B2 | 6/2003 | Uno | |
| 7,446,444 B2 | 11/2008 | Iteya et al. | |
| 7,785,156 B1 | 8/2010 | Liao et al. | |
| 8,405,263 B2 | 3/2013 | Ando et al. | |
| 9,018,940 B2 | 4/2015 | Mizutani et al. | |
| 9,428,246 B2 | 8/2016 | Kitamura et al. | |
| 2007/0103373 A1* | 5/2007 | Wallace ............... | H01Q 1/243 343/702 |
| 2014/0002060 A1* | 1/2014 | Mizutani ............... | B62J 45/423 324/163 |

FOREIGN PATENT DOCUMENTS

| | | |
|---|---|---|
| DE | 202008013426 U1 | 2/2009 |
| DE | 20 2011 107 127 U1 | 6/2012 |
| DE | 10 2013 010 809 A1 | 1/2014 |
| JP | 2016-97826 A | 5/2016 |
| JP | 2020-9053 A | 1/2020 |
| JP | 2020-104742 A | 7/2020 |

* cited by examiner

*Primary Examiner* — Bryan R Perez
(74) *Attorney, Agent, or Firm* — Global IP Counselors, LLP

(57) ABSTRACT

A hub for a human-powered vehicle is provided that comprises a hub axle, a hub body, an electric power generator, and a communication device. The hub body is rotatably mounted on the hub axle about a rotational axis. The electric power generator is provided between the hub axle and the hub body. The electric power generator is configured to generate electric power by relative rotation between hub axle and the hub body. The communication device is located at least partly outside of the hub body. The communication device includes a wireless communicator configured to wirelessly communicate with an additional wireless communicator.

17 Claims, 16 Drawing Sheets

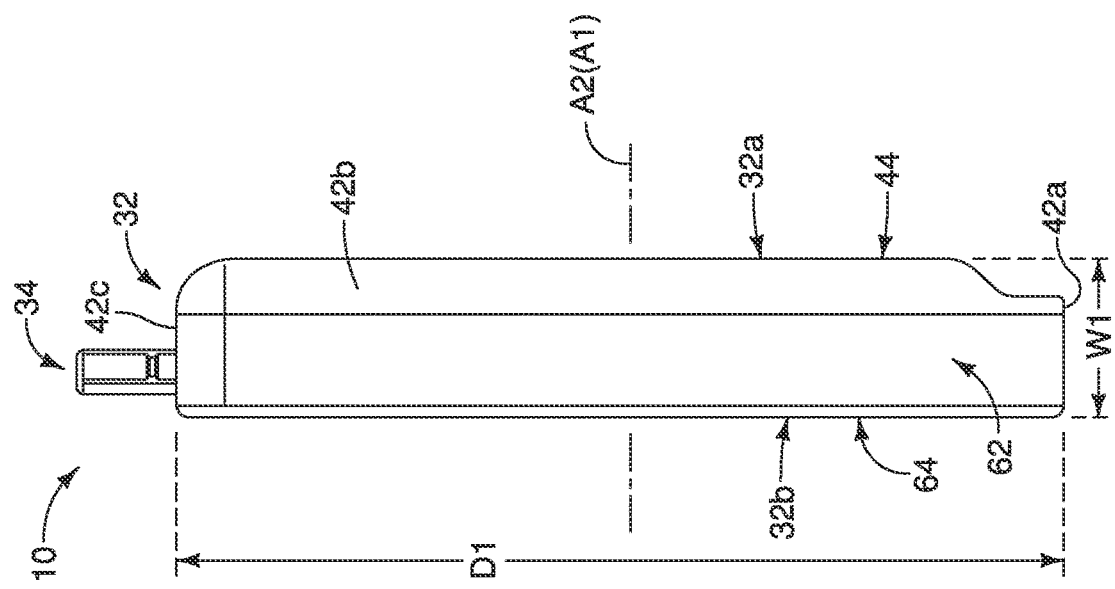
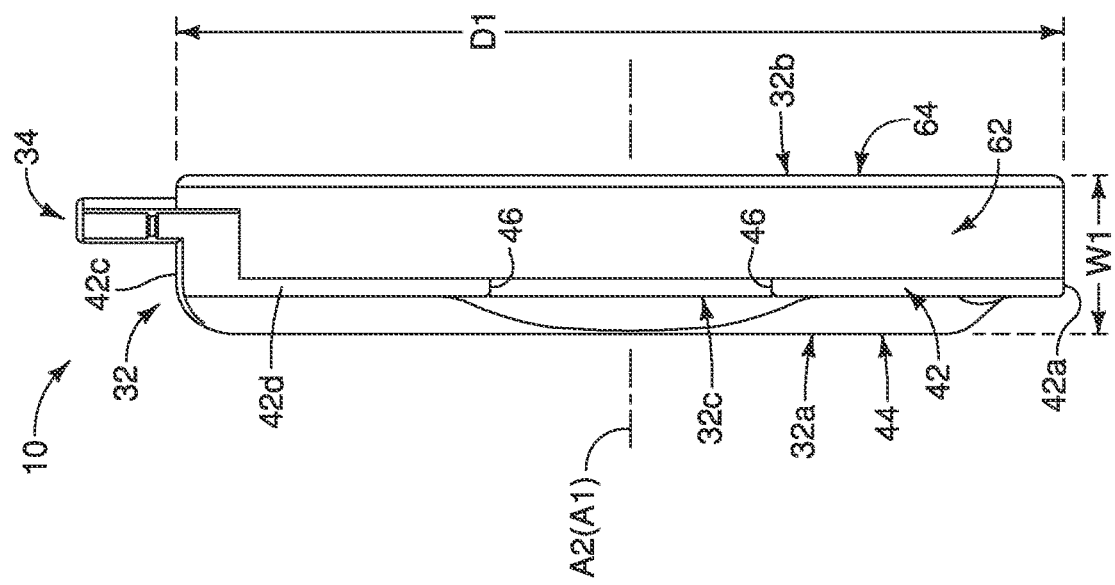

HUB FOR HUMAN-POWERED VEHICLE

BACKGROUND

Technical Field

This disclosure generally relates to a hub for a human-powered vehicle. More specifically, the present disclosure relates to a hub for a human-powered vehicle that is provided with an electric power generating device.

Background Information

Some wheels for human-powered vehicles (e.g., bicycle) have a hub that rotatably supports a wheel. For example, the hub includes has a hub axle and a hub body rotatably disposed around the hub axle. The hub axle is non-rotatably mounted to a frame of the human-powered vehicle. The hub body is coaxially coupled to the hub axle so that the hub body is disposed radially outwardly with respect to the hub axle. The hub body is coupled to a wheel rim that supports a tire. In some cases, the hub is provided with an electric power generating device to generate electric power in accordance with the driving of the human-powered vehicle.

SUMMARY

Generally, the present disclosure is directed to various features of a hub for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub for a human-powered vehicle is provided that basically comprises a hub axle, a hub body, an electric power generator and a communication device. The hub body is rotatably mounted on the hub axle about a rotational axis. The electric power generator is provided between the hub axle and the hub body. The electric power generator is configured to generate electric power by relative rotation between hub axle and the hub body. The communication device is located at least partly outside of the hub body. The communication device includes a wireless communicator configured to wirelessly communicate with an additional wireless communicator.

With the hub according to the first aspect, it is possible to provide a hub having a wireless communicator that can wirelessly communicate with an additional wireless communicator.

In accordance with a second aspect of the present disclosure, the hub according to the first aspect further comprises a housing provided to one of the hub axle and the hub body, the housing configured to at least partly accommodate the communication device.

With the hub according to the second aspect, it is possible to protect the communication device by the housing.

In accordance with a third aspect of the present disclosure, the hub according to the second aspect is configured so that the housing is non-rotatably coupled to the hub axle.

With the hub according to the third aspect, it is possible to stationary support the communication device with respect to the hub axle.

In accordance with a fourth aspect of the present disclosure, the hub according to the third aspect is configured so that the housing includes a first dimension extending in an axial direction of the hub axle and a second dimension extending in a radial direction of the hub axle, the first dimension being smaller than the second dimension.

With the hub according to the fourth aspect, it is possible to provide a housing that is relatively thinner in a direction parallel to the rotational axis.

In accordance with a fifth aspect of the present disclosure, the hub according to the fourth aspect is configured so that the housing is provided separately from the hub body.

With the hub according to the fifth aspect, it is possible to arrange the housing at a desired location without being restricted by the hub body.

In accordance with a sixth aspect of the present disclosure, the hub according to any one of the third to fifth aspects is configured so that the housing includes an axle receiving opening through which the hub axle extends.

With the hub according to the sixth aspect, it is possible to make the diameter of the hub with the housing smaller.

In accordance with a seventh aspect of the present disclosure, the hub according to any one of the third to sixth aspects is configured so that the housing includes an electrical connector configured to be connected to an additional component.

With the hub according to the seventh aspect, it is possible to provide the electric power generated by the electric power generator to the additional component through the electrical connector.

In accordance with an eighth aspect of the present disclosure, the hub according to any one of the third to seventh aspects is configured so that the housing includes a first part and a second part that are coupled to each other.

With the hub according to the eighth aspect, it is possible to easily install the communication device in the housing.

In accordance with a ninth aspect of the present disclosure, the hub according to the second aspect is configured so that the housing at least partly overlaps with the hub body as viewed perpendicular to the rotational axis.

With the hub according to the ninth aspect, it is possible to make the axial dimension of the hub with the housing smaller.

In accordance with a tenth aspect of the present disclosure, the hub according to the ninth aspect is configured so that the housing is at least partly integrated with the hub body.

With the hub according to the tenth aspect, it is possible to at least partly form the housing with the hub body.

In accordance with an eleventh aspect of the present disclosure, the hub according to any one of the first to tenth aspects is configured so that the communication device includes an antenna configured to be connected to the wireless communicator.

With the hub according to the eleventh aspect, it is possible for the communication device to wirelessly communicate through the antenna.

In accordance with a twelfth aspect of the present disclosure, the hub according to the eleventh aspect is configured so that the communication device includes a circuitry electrically connected to the antenna.

With the hub according to the twelfth aspect, it is possible for the communication device to process signals transmitted or received through the antenna.

In accordance with a thirteenth aspect of the present disclosure, the hub according to the twelfth aspect is configured so that the antenna is provided separately from the circuitry.

With the hub according to the thirteenth aspect, it is possible to arrange the antenna at a desired location without being restricted by the circuitry.

In accordance with a fourteenth aspect of the present disclosure, the hub according to the twelfth aspect is configured so that the antenna is integrated to the circuitry.

With the hub according to the fourteenth aspect, it is possible to make the communication device smaller.

In accordance with a fifteenth aspect of the present disclosure, the hub according to any one of the eleventh to fourteenth aspects is configured so that the antenna includes a monopole antenna.

With the hub according to the fifteenth aspect, it is possible to downsize the antenna.

In accordance with a sixteenth aspect of the present disclosure, the hub according to any one of the first to fifteenth aspects is configured so that the communication device includes a circuitry electrically connected to the electric power generator and the wireless communicator.

With the hub according to the sixteenth aspect, it is possible to convert the electric power generated by the electric power generator to appropriate voltage for the wireless communicator.

In accordance with a seventeenth aspect of the present disclosure, the hub according to any one of the first to sixteenth aspects is configured so that the wireless communicator is electrically connected to a detector, the detector being configured to detect information relating to a riding condition of the human-powered vehicle.

With the hub according to the seventeenth aspect, it is possible to wirelessly transmit signal based on detection result of the detector.

In accordance with an eighteenth aspect of the present disclosure, the hub according to the seventeenth aspect is configured so that the detector includes at least one of a speed detector and an acceleration detector.

With the hub according to the eighteenth aspect, it is possible to wirelessly transmit signal based on detection result of the speed detector or acceleration detector.

In accordance with a nineteenth aspect of the present disclosure, the hub according to any one of the first to eighteenth aspect is configured so that the wireless communicator is electrically connected to a power storage which is electrically connected to the electric power generator, the power storage configured to store the electric power generated from the electric power generator.

With the hub according to the nineteenth aspect, it is possible to stably supply the electric power generated by the electric power generator to the wireless communicator.

In accordance with a twentieth aspect of the present disclosure, the hub according to any one of the first to nineteenth aspects is configured so that the wireless communicator is electrically connected to a controller configured to control at least one of an operating device and an operated device according to at least one of a communication signal related to the communication device and information detected by a detector.

With the hub according to the twentieth aspect, it is possible to wirelessly control at least one of the operating device and the operated device.

Also, other objects, features, aspects and advantages of the disclosed hub will become apparent to those skilled in the art from the following detailed description, which, taken in conjunction with the annexed drawings, discloses preferred embodiments of the hub.

BRIEF DESCRIPTION OF THE DRAWINGS

Referring now to the attached drawings which form a part of this original disclosure:

FIG. 11 is a rear elevational view of the connector device illustrated in FIGS. 7 to 10.

FIG. 12 is a front elevational view of the connector device illustrated in FIGS. 7 to 11.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
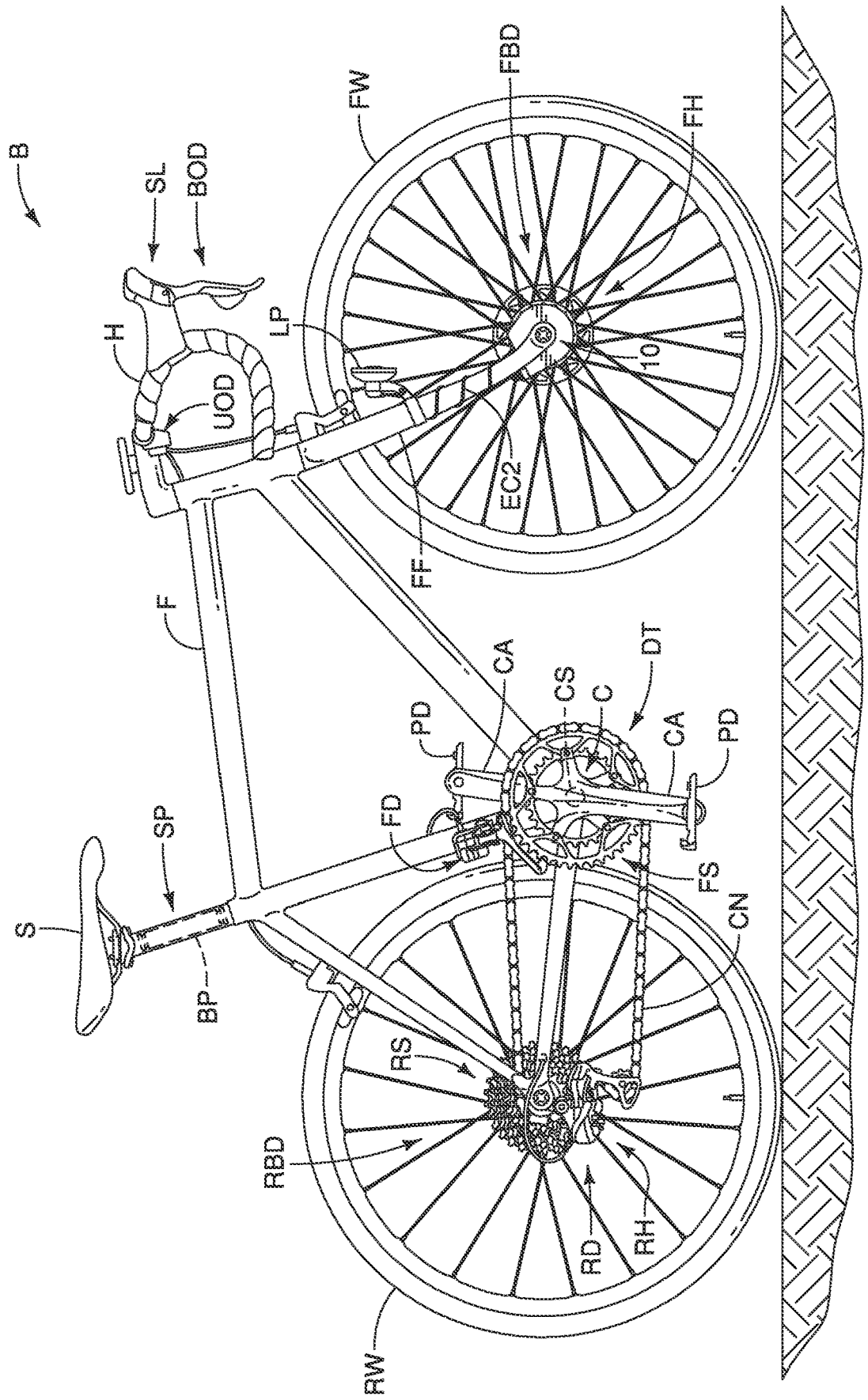
FIG. 1 is a side elevational view of a human powered vehicle (e.g., a bicycle) that is equipped with a hub in accordance with the illustrated embodiments of the present disclosure.

Referring initially to FIG. 1, a human-powered vehicle B is illustrated that is used in the illustrated embodiments. In the embodiments described below, the human-powered vehicle B refers to a bicycle. As seen in FIG. 1, the human-powered vehicle B is a multi-purpose road bike or gravel bike, but the human-powered vehicle B is not limited to being used with this kind of road bikes. The human-powered vehicle B basically includes a frame F, a front fork FF, a front wheel FW, a rear wheel RW, a handlebar H and a drivetrain DT. The drivetrain DT basically include a crankshaft CS, a pair of crank arms CA, a pair of pedals PD, a plurality of front sprockets FS, a plurality of rear sprockets RS and a chain CN. The crank arms CA are mounted at opposite ends of the crankshaft CS. Each of the pedals PD is rotatably coupled to the distal end of a corresponding one of the crank arms CA. The front sprockets FS are arranged on one of the crank arms CA. The rear sprockets RS are arranged on a rear hub RH of the rear wheel RW. In the first embodiment, the chain CN runs around drivetrain DT, one of the front sprockets FS and one of the rear sprockets RS. A driving force applied by the rider of the human-powered vehicle B to the pedals PD is transmitted to the rear wheel RW via the front sprockets FS, the chain CN, and the rear sprockets RS. Optionally, the human-powered vehicle B can include an electric drive unit to assist the driving force of the rider. Namely, the human-powered vehicle B can be an e-bike.

Here, the human-powered vehicle B further includes an electric rear derailleur RD for shifting the chain CN between the rear sprockets RS and an electric front derailleur FD for shifting the chain CN between the front sprockets FS. The rear derailleur RD and the front derailleur FD are each operated by a shift operating device or shifter SL. While the shift operating device SL is illustrated for controlling both of the rear derailleur RD and the front derailleur FD, it will be apparent from this disclosure that each of the rear derailleur RD and front derailleur FD can be controlled by a separate shift operating device. Here, the shift operating device SL is an electric shifter with a hydraulic braking function. Thus, in the illustrated embodiment, the rear derailleur RD and the front derailleur FD are examples of electric vehicle components or operated devices, while the shift operating device SL is an example of an operating device.

In the illustrated embodiment, the human-powered vehicle B further includes a height adjustable seatpost SP. The height adjustable seatpost SP is mounted to a seat tube of the frame F in a conventional manner and supports a bicycle seat or saddle S in any suitable manner. In the illustrated embodiment, the height adjustable seatpost SP has an electric motor or actuator and can be electrically adjustable in response to a user input relative to a user operating device UOD. Thus, in the illustrated embodiment, the height adjustable seatpost SP is an example of an electric vehicle component or operated device, while the user operating device UOD is an example of an operating device.

In some cases, the human-powered vehicle B can further include other electric vehicle components or operated devices. For example, the human-powered vehicle B can include an electrically adjustable suspension as an electric vehicle component or operated device. The electrically adjustable suspension can be provided to the front fork FF or between a front frame body and a rear frame body when the frame F has a swingarm configuration. The stiffness and/or stoke length of the electrically adjustable suspension can be electrically adjusted in response to a user input relative to the user operating device UOD, for example. In this case, the electrically adjustable suspension can be an example of an electric vehicle component or operated device, while the user operating device UOD can be an example of an operating device.

Furthermore, the human-powered vehicle B can include an electric brake device as an electric vehicle component or operated device. Specifically, in the illustrated embodiment, as seen in FIG. 1, the bicycle V includes front and rear brake devices FBD and RBD. With the front and rear brake devices FBD and RBD, the front wheel FW has a front brake rotor so that the front brake rotor rotates integrally with the front wheel FW, while the rear wheel RW has a rear brake rotor so that the rear brake rotor rotates integrally with the rear wheel RW. Furthermore, with the front and rear brake devices FBD and RBD, disc brake calipers are mounted to the frame F to engage the front brake rotor and the rear brake rotor, respectively, in a conventional manner. Here, the disc brake calipers are hydraulically operated, for example. The disc brake calipers are fluidly connected to brake operating devices BOD by hydraulic hoses, respectively. Here, the front and rear brake devices FBD and RBD can have an electric motor or actuator at the brake operating devices BOD. Specifically, the disc brake calipers are hydraulically operated by hydraulic pressure that is generated by the electric motors of the brake operating devices BOD, respectively, in response to a user operation relative to the brake operating devices BOD, respectively. Here, the disc brake calipers are hydraulically operated by hydraulic pressure that is generated by the electric motors of the brake operating devices BOD, respectively. However, the disc brake calipers can be a cable-actuated brake and mechanically operated by mechanical force that is generated by the electric motors of the brake operating devices BOD, respectively. In any case, the front and rear brake devices FBD and RBD can be examples of electric vehicle components or operated devices, while the brake operating devices BOD can be examples of operating devices.

In the illustrated embodiment, the human-powered vehicle B can include a battery pack BP that can provide electric power to the electric vehicle components or operated devices, such as the rear derailleur RD, the front derailleur FD, the height adjustable seatpost SP, the electrically adjustable suspension, the electric brake device, and any other electric vehicle component that uses electric power. The battery pack BP can also provide electric power to the operating devices, such as the shift operating device SL, the user operating device UOD, the brake operating devices BOD, and any other operating device that uses electric power.

In the illustrated embodiment, a front hub FH (e.g., a hub for a human-powered vehicle) is provided for the human-powered vehicle B. The front hub FH supports the front wheel FW relative to the front fork FF, while the rear hub RH supports the rear wheel RW relative to the frame F. In the illustrated embodiment, the front hub FH includes a hub dynamo (an energy-harvesting power source) for providing electric power to one or more electric vehicle components of the human-powered vehicle B. Specifically, in the illustrated embodiment, the human-powered vehicle B includes a bicycle lamp or light LP, and the hub dynamo provides electric power to the bicycle lamp LP. In some cases, the hub dynamo can be provided to the rear hub RH.

Figure 2:
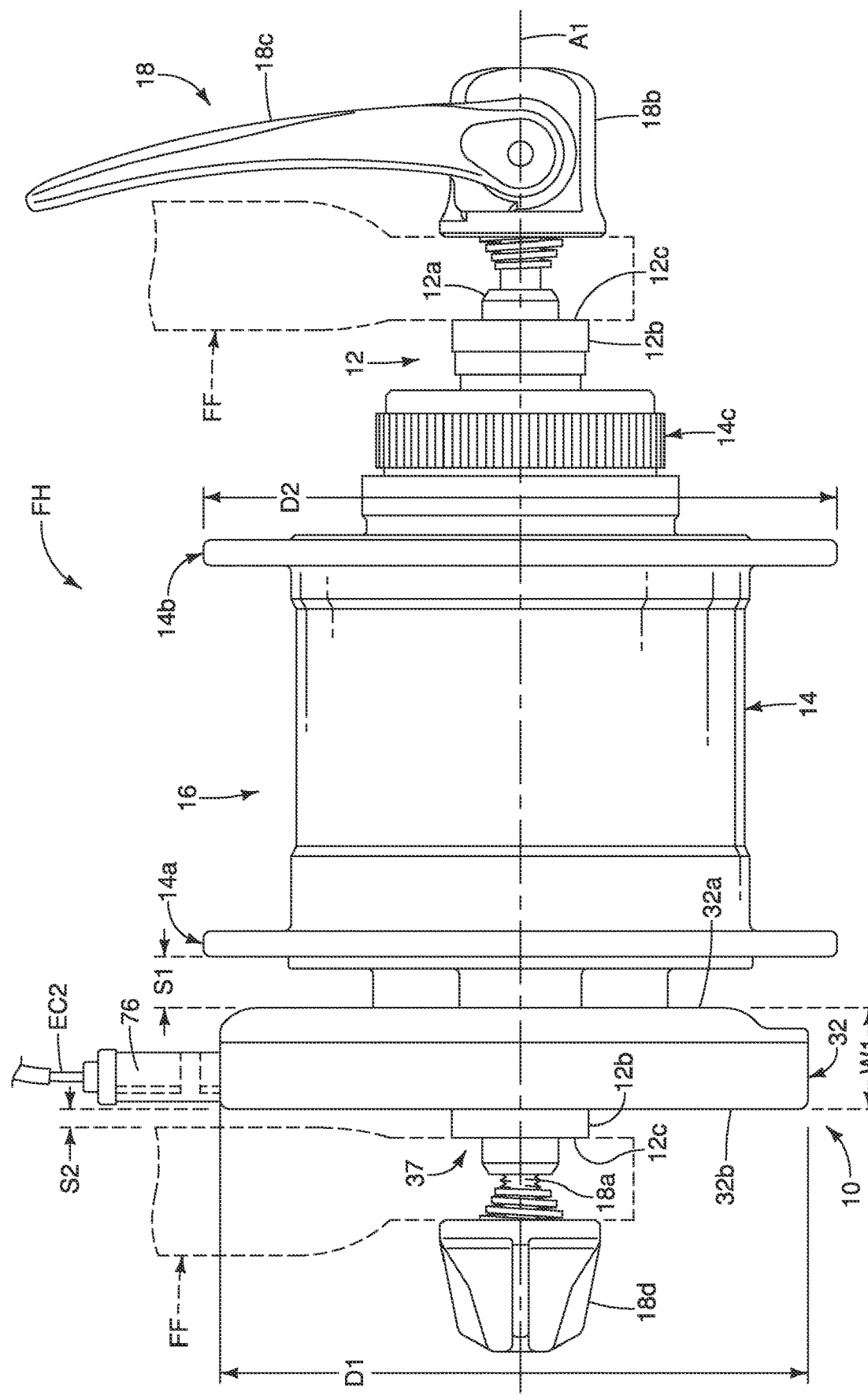
FIG. 2 is a front elevational view of the hub attached to a vehicle body of the human-powered vehicle illustrated in FIG. 1 in accordance with one embodiment.
Figure 3:
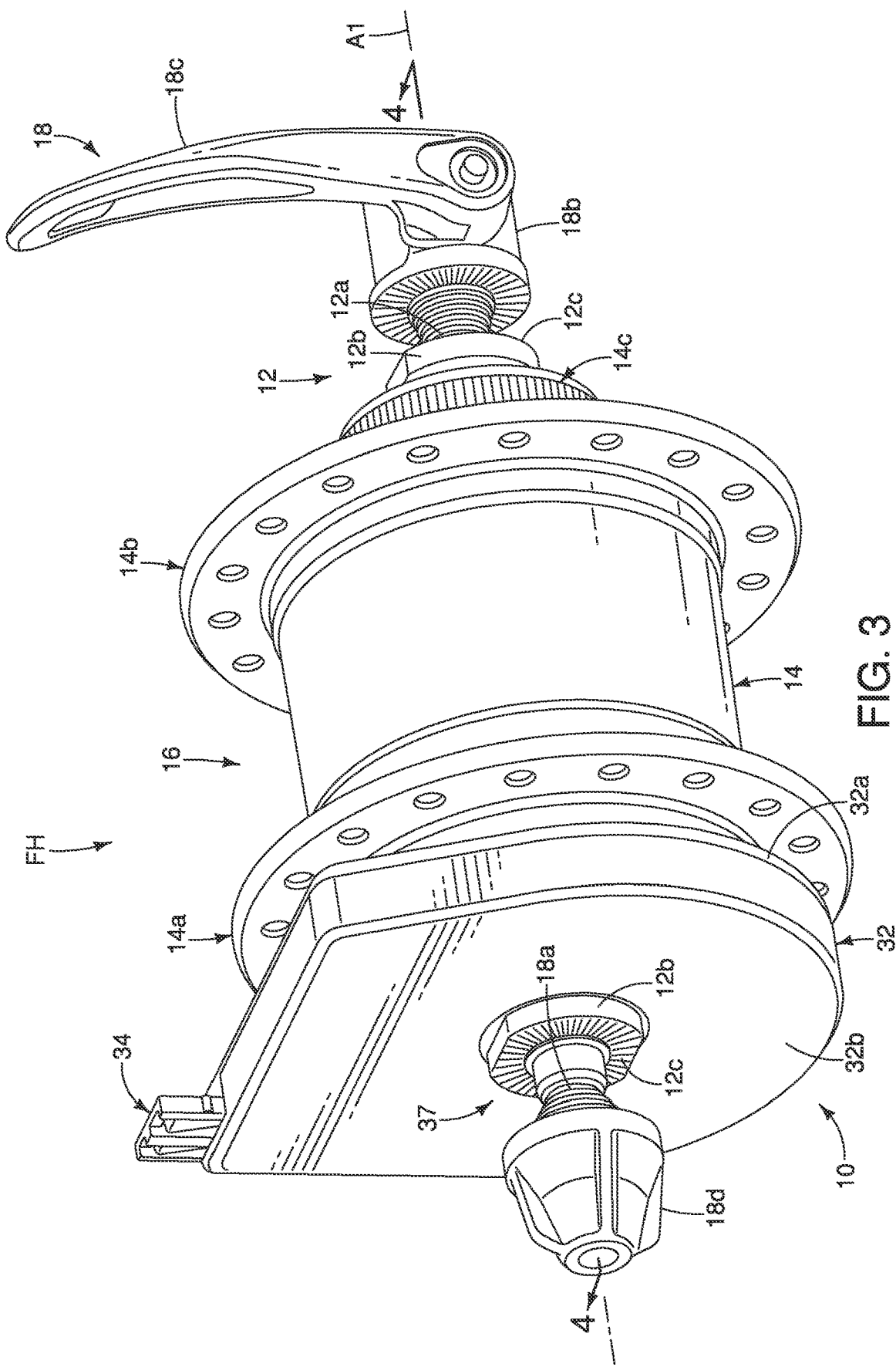
FIG. 3 is a perspective view of the hub illustrated in FIG. 2.

Referring now to FIGS. 2 to 5, the structure of the front hub FH will now be described. Here, the front hub FH comprise a connector device 10. The detailed configuration of the connector device 10 will be described in detail later. The front hub FH also comprises a hub axle 12, a hub body 14, and an electric power generator 16 (FIG. 3). The hub axle 12 has a center axis A1, which forms a rotational axis of the hub body 14. The hub axle 12 is configured to be non-rotatably attached to the front fork FF of the frame F. The hub body 14 is rotatably mounted on the hub axle 12 about the center axis A1.

As seen in FIGS. 2 to 5, the hub axle 12 is a rigid member made of a suitable material such as a metallic material. Here, the hub axle 12 is a tubular member. The hub axle 12 can be a one-piece member or made of several pieces. Here, the hub axle 12 includes a main body 12*a* and a pair of end pieces 12*b*. The end pieces 12*b* are non-rotatably mounted to both ends of the main body 12*a*. In this way, both ends of the main body 12*a* are received in mounting openings of the front fork FF. Here, the end pieces 12*b* each have a rotation restriction surface 12*c* which engages the front fork FF so that rotation of the hub axle 12 relative to the front fork FF is restricted.

Here, as seen in FIG. 2, the front hub FH further comprises a wheel holding mechanism 18 for securing the hub axle 12 to the front fork FF. The wheel holding mechanism 18 basically includes a shaft or skewer 18*a*, a cam body 18*b*, a cam lever 18*c* and an adjusting nut 18*d*, and is also called a quick release mechanism. The cam lever 18*c* is attached to one end of the skewer 18*a* via the cam body 18*b*, while the adjusting nut 18*d* is threaded on the other end of the skewer 18*a*. The lever 18*c* is attached to the cam body 18*b*. The cam body 18*b* is coupled between the skewer 18*a* and the cam lever 18*c* to move the skewer 18*a* relative to the cam body 18*b*. Thus, the lever 18*c* is operated to move the skewer 18*a* in the axial direction of the center axis A1 with respect to the cam body 18*b* to change the distance between the cam body 18*b* and the adjusting nut 18*d*. Preferably, a compression spring is provided at each end of the skewer 18*a*. Alternatively, the hub axle 12 can be non-rotatably attached to the front fork FF with other attachment structures as needed and/or desired.

The hub body 14 is rotatably mounted around the hub axle 12 to rotate in a driving rotational direction. The driving rotational direction corresponds to a forward driving direction of the front wheel FW. The hub body 14 is configured to support the front wheel FW in a conventional manner. More specifically, in the illustrated embodiment, the hub body 14 includes a first outer flange 14*a*, a second outer flange 14*b* and a brake disk support structure 14*c*. The first outer flange 14*a* and the second outer flange 14*b* extend radially outward with respect to the center axis A1. The first outer flange 14*a* and the second outer flange 14*b* are configured to receive a plurality of spokes (FIG. 1) for attaching a rim (FIG. 1) of the front wheel FW to the hub body 14. In this way, the hub body 14 and the front wheel FW are coupled to rotate together. Furthermore, the brake disk support structure 14*c* non-rotatably supports a brake disk as seen in FIG. 1. Specifically, the disk brake support structure 14*c* and the brake disk are coupled together to rotate together.

Figure 4:
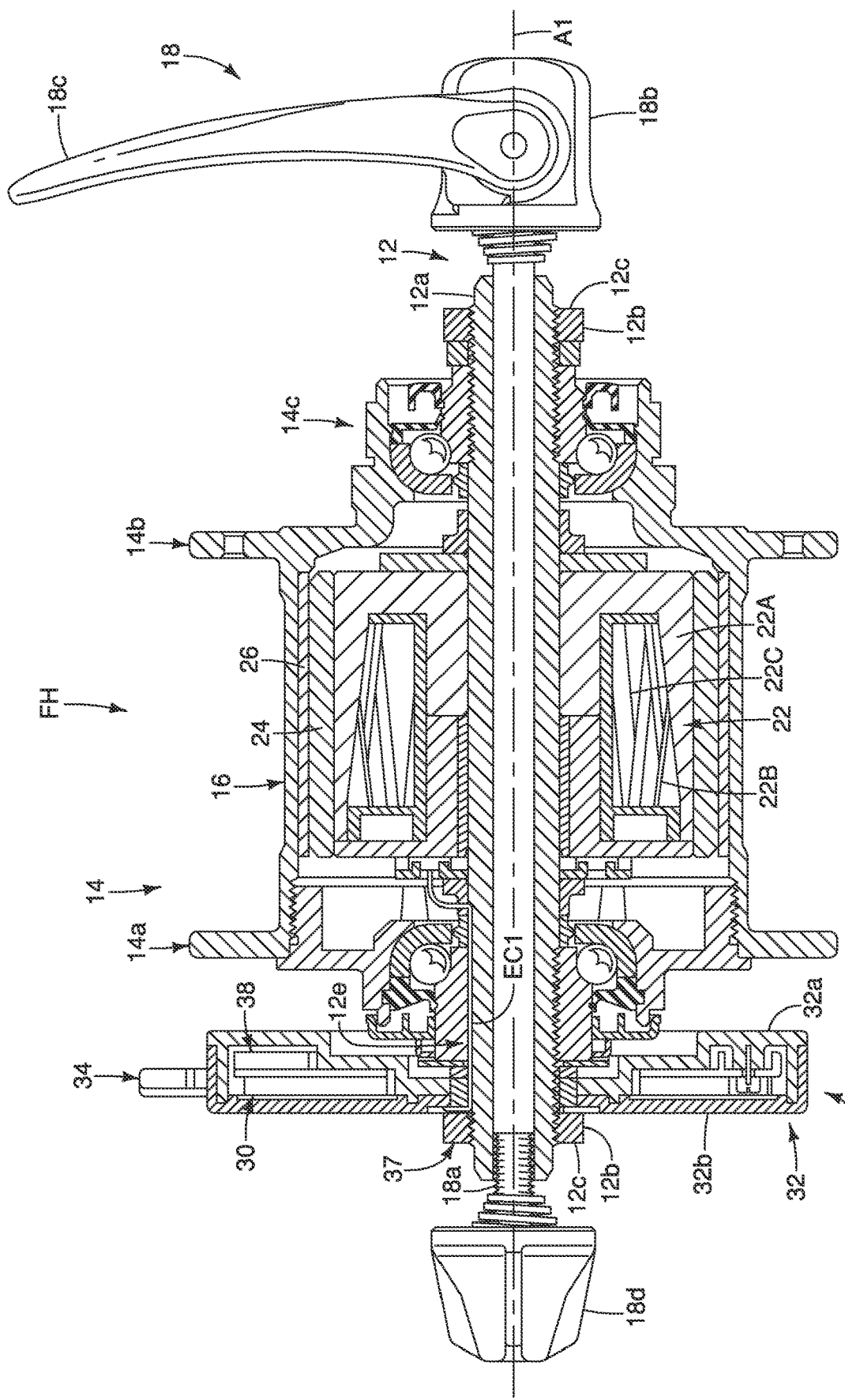
FIG. 4 is a longitudinal cross-sectional view of the hub illustrated in FIGS. 2 and 3 as seen along section line 4-4 of FIG. 3.
Figure 5:
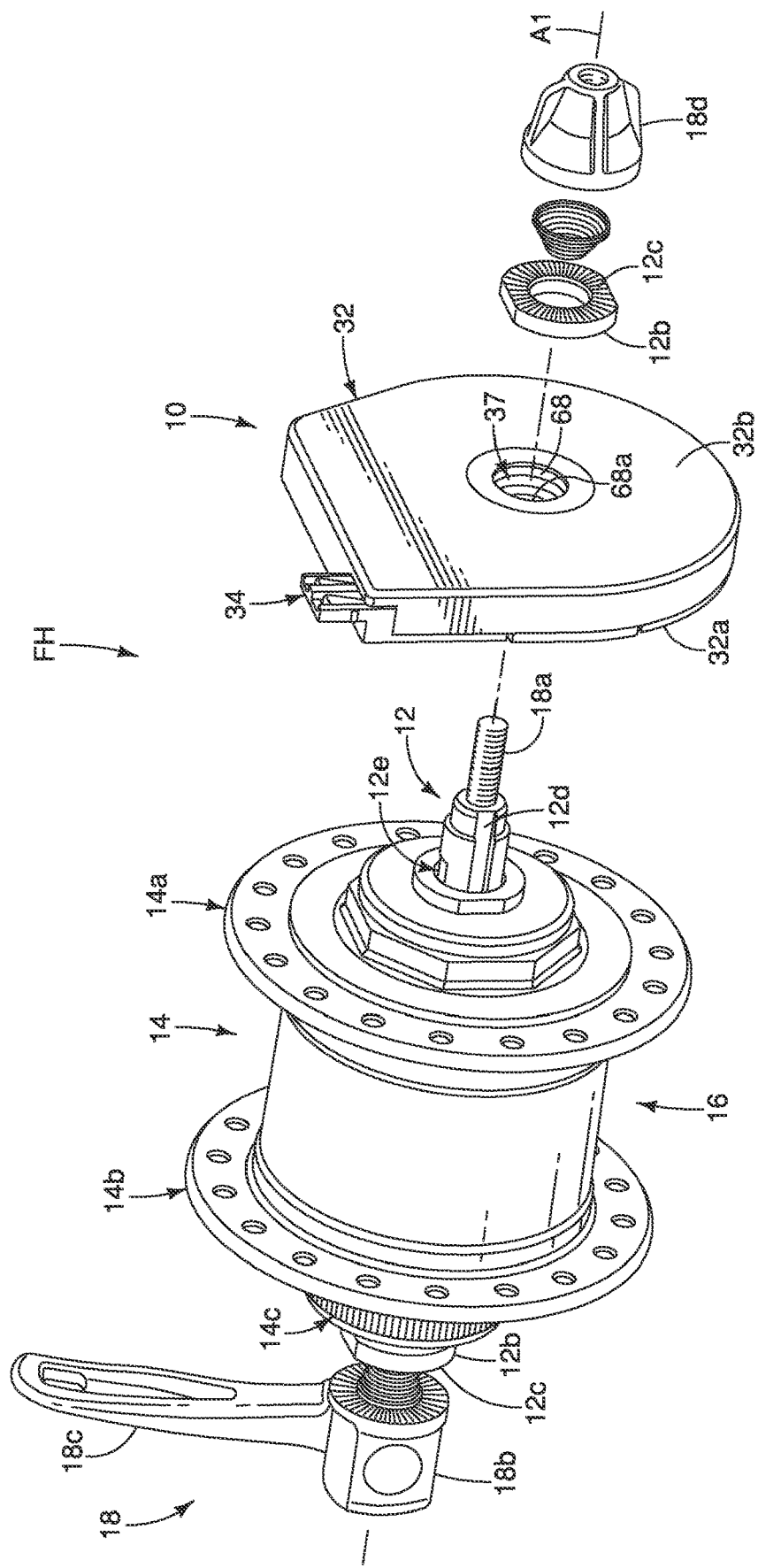
FIG. 5 is a partly exploded perspective view of the hub illustrated in FIGS. 2 to 4.

As seen in FIG. 4, the electric power generator 16 is provided between the hub axle 12 and the hub body 14. The electric power generator 16 is configured to generate electric power by relative rotation between hub axle 12 and the hub body 14. The electric power generator 18 basically includes an armature 22 (i.e., a stator) and a magnet 24 (i.e., a rotor). While the armature 22 is illustrated as being fixed with respect to the hub axle 12 and the magnet 24 is illustrated as being fixed with respect to the hub body 14, the armature 22 can be fixed with respect to the hub body 14 and the magnet 24 can be fixed with respect to the hub axle 12. The armature 22 includes a first yoke 22A, a second yoke 22B and a coil 22C. The first yoke 22A includes two or more first yoke pieces that are arranged in the circumferential direction of the hub axle 12. Likewise, the second yoke 22B includes two or more second yoke pieces that are arranged in the circumferential direction of the hub axle 12 and that alternate with the first yoke pieces of the first yoke 22A. The coil 22C is located between the first yoke 22A and the second yoke 22B. The magnet 24 includes a plurality of magnet parts arranged inside a tubular support 26. The tubular support 26 fixedly coupled to the inside of the hub body 14 so that the magnet 24 and the hub body 14 rotate together around the hub axle 12. The magnet parts of the magnet 24 are arranged so that S-poles and N-poles of the magnet parts are alternately arranged in the circumferential direction of the hub axle 12.

Figure 6:
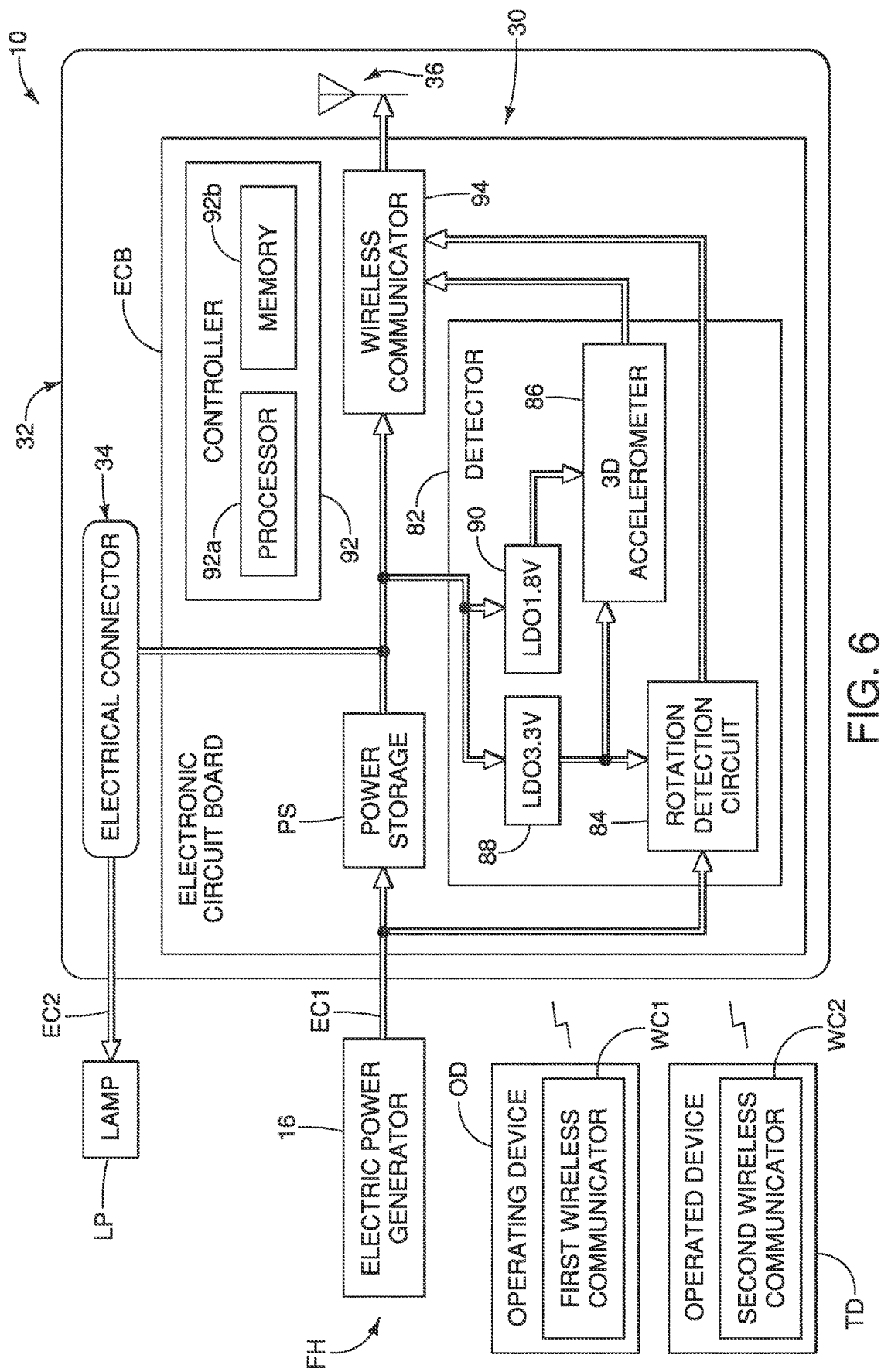
FIG. 6 is a schematic block diagram of the hub illustrated in FIG. 1 in which the hub includes a connector device.
Figure 8:
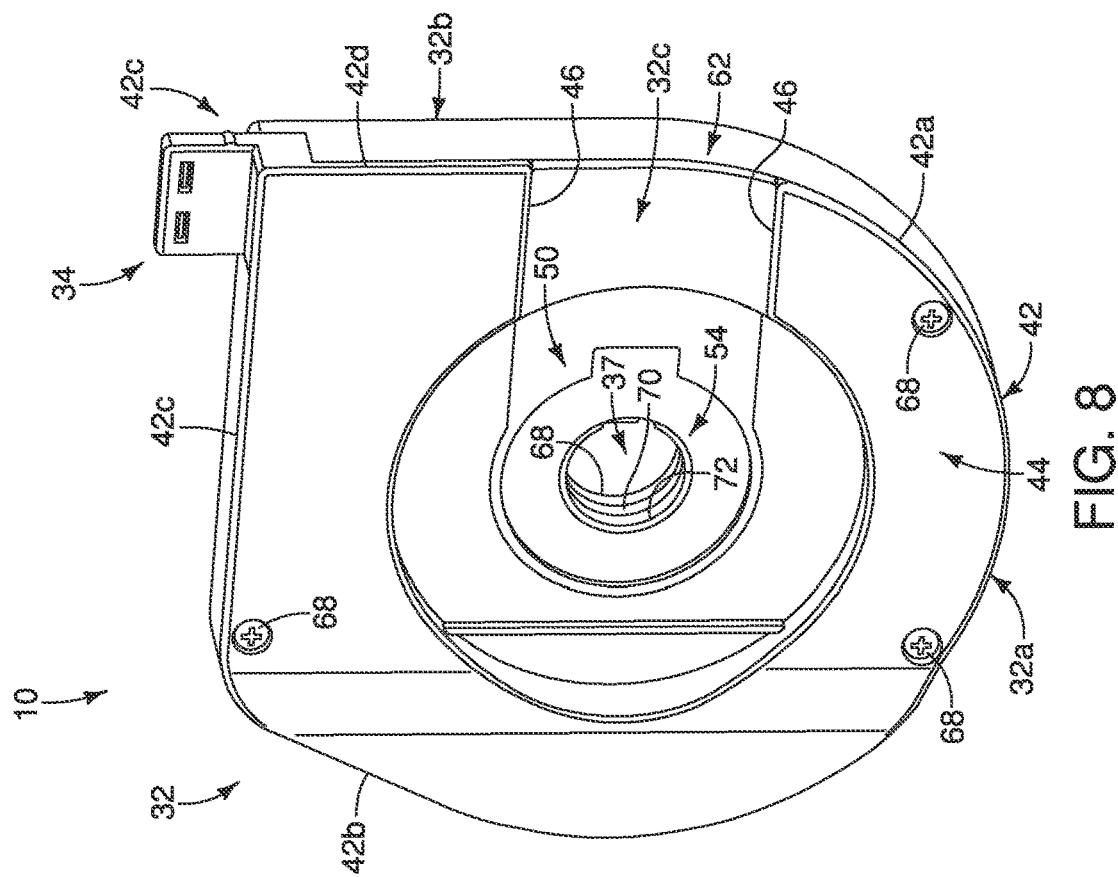
FIG. 8 is an inner side perspective view of the connector device illustrated in FIG. 7.
Figure 7:
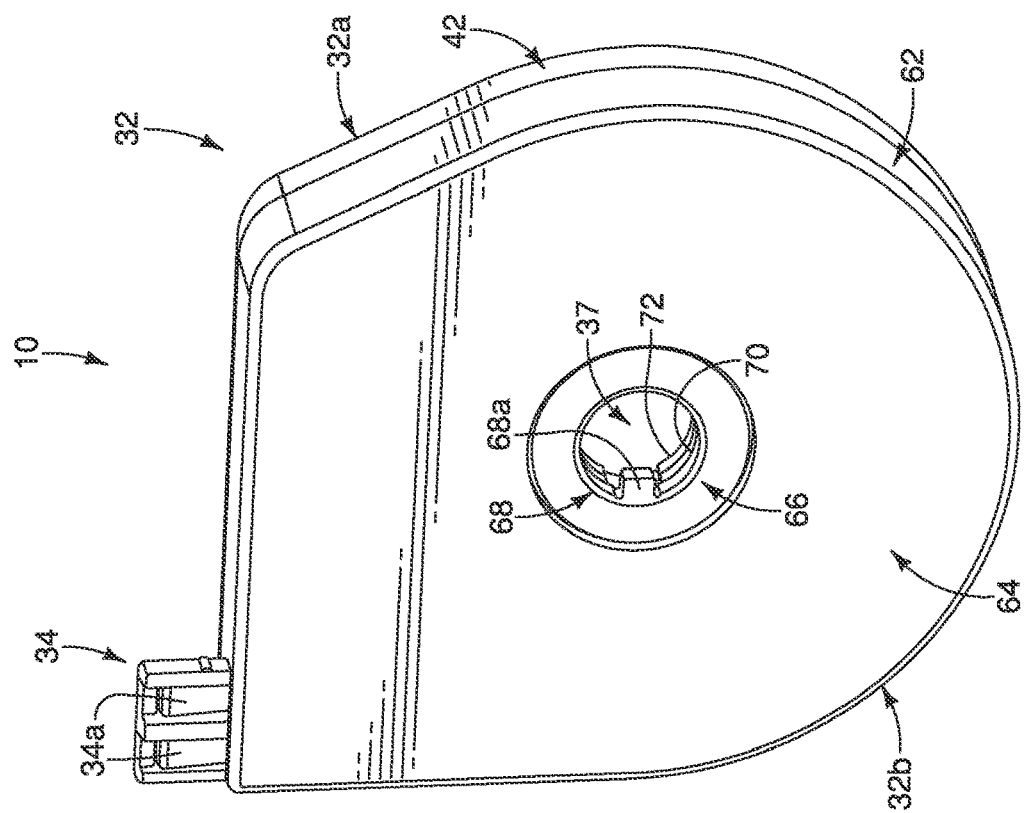
FIG. 7 is an outer side perspective view of the connector device of the hub illustrated in FIGS. 2 to 5.

In the illustrated embodiment, as seen in FIG. 6, the connector device 10 is an electrical device that utilizes the electric power generated by the electric power generator 16 for wireless communications. Furthermore, the connector device 10 also serves as an electrical connector for providing the electric power generated by the electric power generator 16 to various electric vehicle components. In the illustrated embodiment, the lamp LP is electrically connected to the connector device 10 to receive the electric power from the electric power generator 16. Moreover, the connector device 10 can wirelessly communicate with an operating device OD and/or an operated device TD.

In the illustrated embodiment, the shift operating device SL, the user operating device UOD, the brake operating devices BOD, and the like are examples of the operating device OD, while the rear derailleur RD, the front derailleur FD, the height adjustable seatpost SP, the electrically adjustable suspension, the electric brake device, and the like are examples of the operated device TD. In the illustrated embodiment, the operating device OD and the operated device TD includes first and second wireless communicators (e.g., additional wireless communicators) WC1 and WC2 that can wirelessly communicate with the connector device 10. In particular, the first and second wireless communicators WC1 and WC2 are a hardware device capable of transmitting and/or receiving an analog or digital communication signal wirelessly. The terms "wireless communicator" as used herein include a receiver, a transmitter, a transceiver, a transmitter-receiver, and contemplates any device or devices, separate or combined, capable of transmitting and/or receiving wireless communication signals, including command or other signals related to some function of the operating device OD and the operated device TD being controlled. The wireless communication signals can be radio frequency (RF) signals having a frequency that is in a 2.4 GHz band or a 5.0 GHz band, ultra-wide band communication signals, or Bluetooth® communications or any other type of signal suitable for short range wireless communications as understood in the human-powered vehicle field. The first and second wireless communicators WC1 and WC2 can be a one-way wireless communication device such as a transmitter if information only needs to be wirelessly outputted to the connector device 10, or a receiver if information only needs to be wirelessly inputted from the connector device 10. However, in the illustrated embodiment, the first and second wireless communicators WC1 and WC2 are a two-way wireless communication device.

As seen in FIGS. 4 and 6, the connector device 10 includes a communication device 30. Thus, in the illustrated embodiment, the front hub FH comprises the communication device 30. Furthermore, the connector device 10 includes a housing 32. Thus, in the illustrated embodiment, the front hub FH further comprises the housing 32. The housing 32 is configured to at least partially accommodate the communication device 30. Furthermore, in the illustrated embodiment, the housing 32 includes an electrical connector 34. In the illustrated embodiment, the electrical connector 34 is configured to be connected to the lamp LP (e.g., an additional component). As also seen in FIG. 6, the communication device 30 includes an electronic circuit board (e.g., a circuitry) ECB and an antenna 36 that is electrically connected to the electronic circuit board ECB. Thus, in the illustrated embodiment, the communication device 30 includes the electronic circuit board ECB (e.g., the circuitry) electrically connected to the antenna 36.

As seen in FIGS. 2 to 5, the housing 32 is provided to the hub axle 12. In particular, the housing 32 is non-rotatably coupled to the hub axle 12. More specifically, the housing 32 includes an axle receiving opening 37 through which the hub axle 12 extends. Furthermore, the housing 32 is provided separately from the hub body 14. Specifically, the housing 32 is axially arranged relative to the hub body 14 along the center axis A1, and is disposed outside the hub body 14. Thus, in the illustrated embodiment, the communication device 30 accommodated by the housing 32 is also located at least partly outside of the hub body 14.

More specifically, as seen in FIG. 2, the housing 32 is disposed between the hub body 14 and the front fork FF along the center axis A1. In particular, the housing 32 is disposed spaced apart from the hub body 14 with a spacing S1 therebetween, and is disposed spaced apart from the front fork FF with a spacing S2 therebetween. The spacings S1 and S2 are preferably greater than 5 mm for ensuring a clearance between the antenna 36 and an adjacent conducting material, such as metal, carbon, etc.

More specifically, as seen in FIGS. 7 to 15, the housing 32 includes a first part 32a and a second part 32b that are coupled to each other. Specifically, the first part 32a and the second part 32b are fixedly coupled to each other to define an internal space 38 (FIG. 2) therebetween. Preferably, the first part 32a and the second part 32b are rigid members made from a suitable material. For example, the first part 32a and the second part 32b are made of a resin material, and can be injected molded members.

Figure 15:
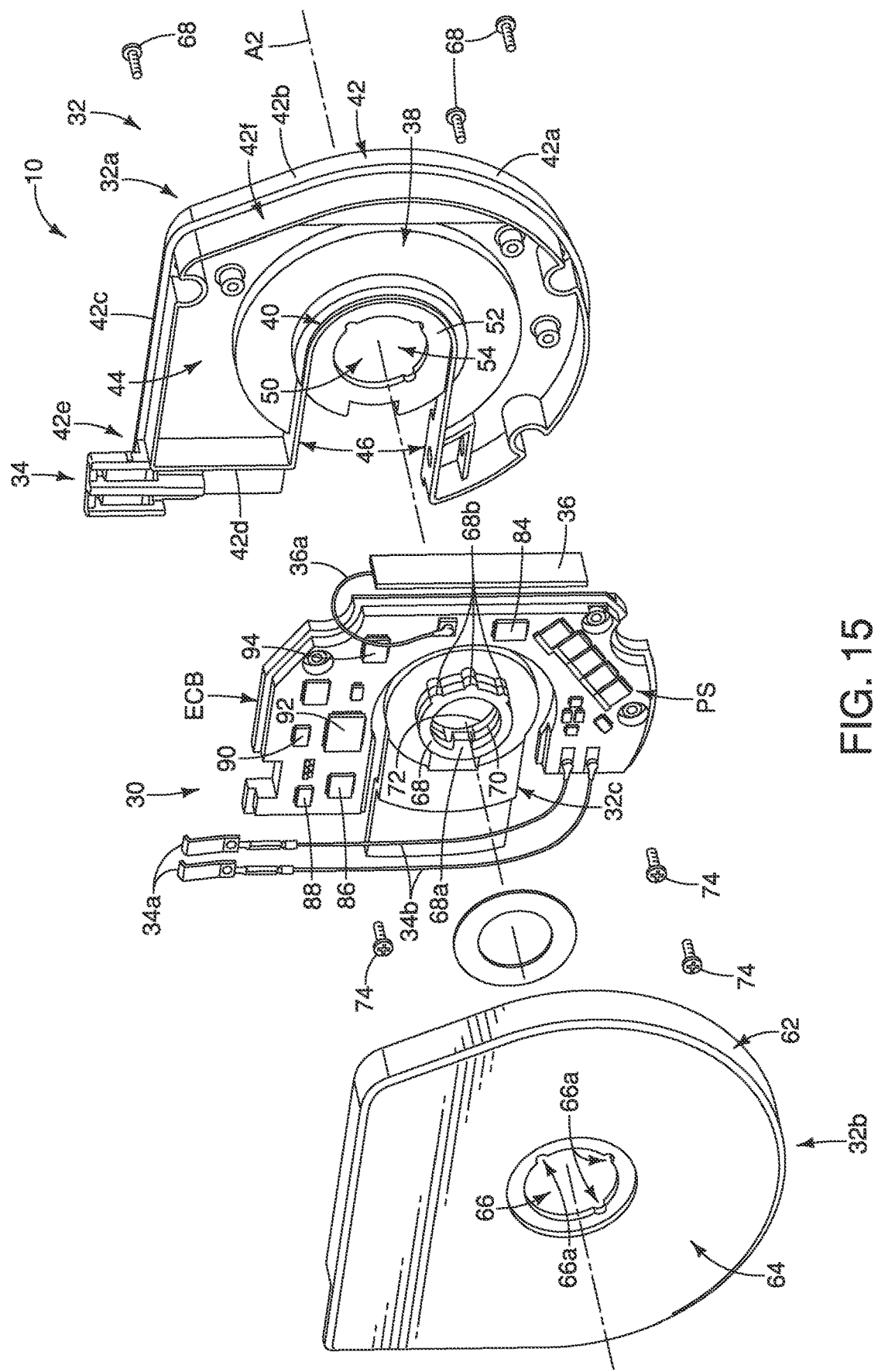
FIG. 15 is an exploded perspective view of the connector device illustrated in FIGS. 7 to 12.

As seen in FIG. 15, the first part 32a includes an inner peripheral portion 40, an outer peripheral portion 42, an end wall portion 44 and a pair of connecting portions 46. The end wall portion 44 interconnects the inner peripheral portion 40 and the outer peripheral portion 42 to at least partly define the internal space 38 of the housing 32. The connecting portions 46 interconnect the inner peripheral portion 40 and the outer peripheral portion 42. Specifically, the connecting portions 46 extend parallel to each other from the inner peripheral portion 40 to the outer peripheral portion 42. The inner peripheral portion 40 at least partially defines an enclosed area 50. The first part 32a further includes a center portion 52 with a center opening 54 in the enclosed area 50. Specifically, the center portion 52 extends radially inward from the inner peripheral portion 40 with respect to a center axis A2 of the center opening 54. The outer peripheral portion 42 is spaced radially outward from the inner peripheral portion 40 with respect to the center axis A2 of the center opening 54. The center axis A2 is coincident with the center axis A1 of the hub axle 12. The center axis A2 is defined as a center axis even if the center opening 54 is not circular opening. In the illustrated embodiment, the center opening 54 defines a through opening for receiving the hub axle 12.

Figure 10:
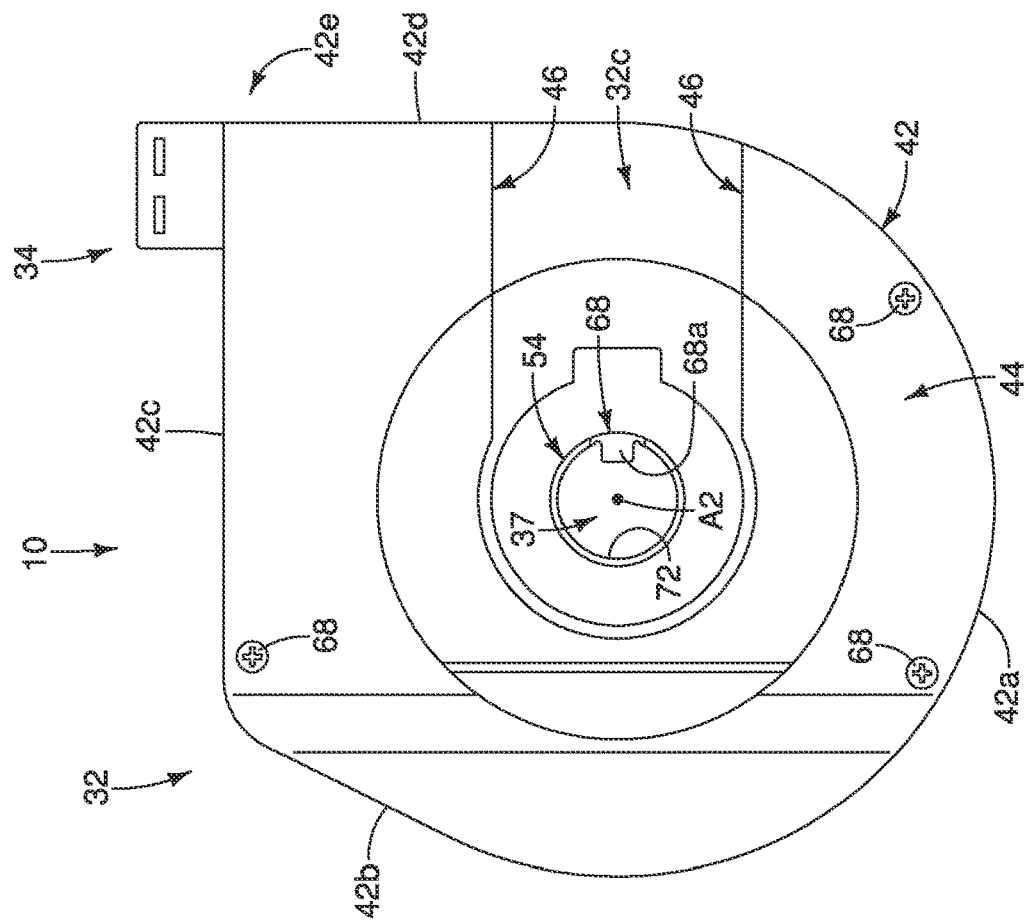
FIG. 10 is an inner side elevational view of the connector device illustrated in FIGS. 7 to 9.

In the illustrated embodiment, as seen in FIG. 10, the outer peripheral portion 42 has an outer perimeter with a curved section 42a, a first planar section 42b, a second planar section 42c and a third planar section 42d. The curved section 42a extends about 180 degrees about the center axis A2 of the center opening 54 from an outer end of one of the connecting portions 46. The first planar section 42b tangentially extends from the curved section 42a towards the second planar section 42c. The first planar section 42b and the second planar section 42c are smoothly connected via a curved corner. The second planar section 42c extends parallel to the connecting portions 46. The third planar section 42d extends perpendicularly from the second planar section 42c towards an outer end of the other one of the connecting portions 46 to form a right-angle corner 42e between the second planar section 42c and the third planar section 42d. In the illustrated embodiment, the electrical connector 34 is disposed at the corner 42e. In the illustrated embodiment, the outer peripheral portion 42 has a stepped section 42f that has a reduced thickness along the outer perimeter of the outer peripheral portion 42.

Figure 9:
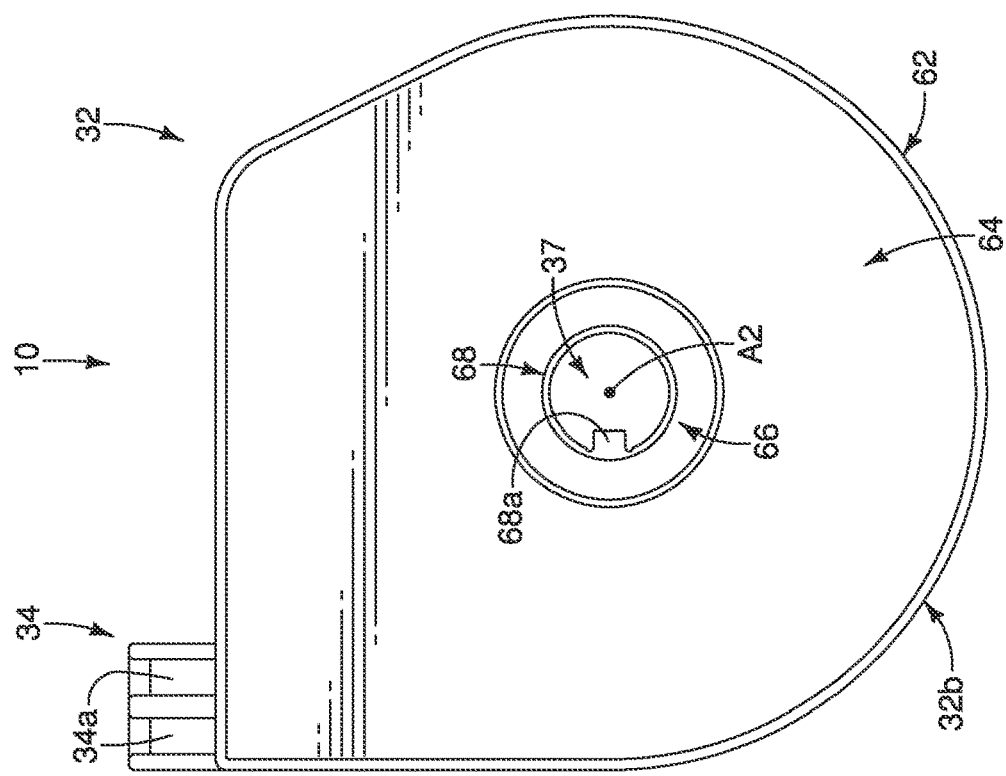
FIG. 9 is an outer side elevational view of the connector device illustrated in FIGS. 7 and 8.
Figure 13:
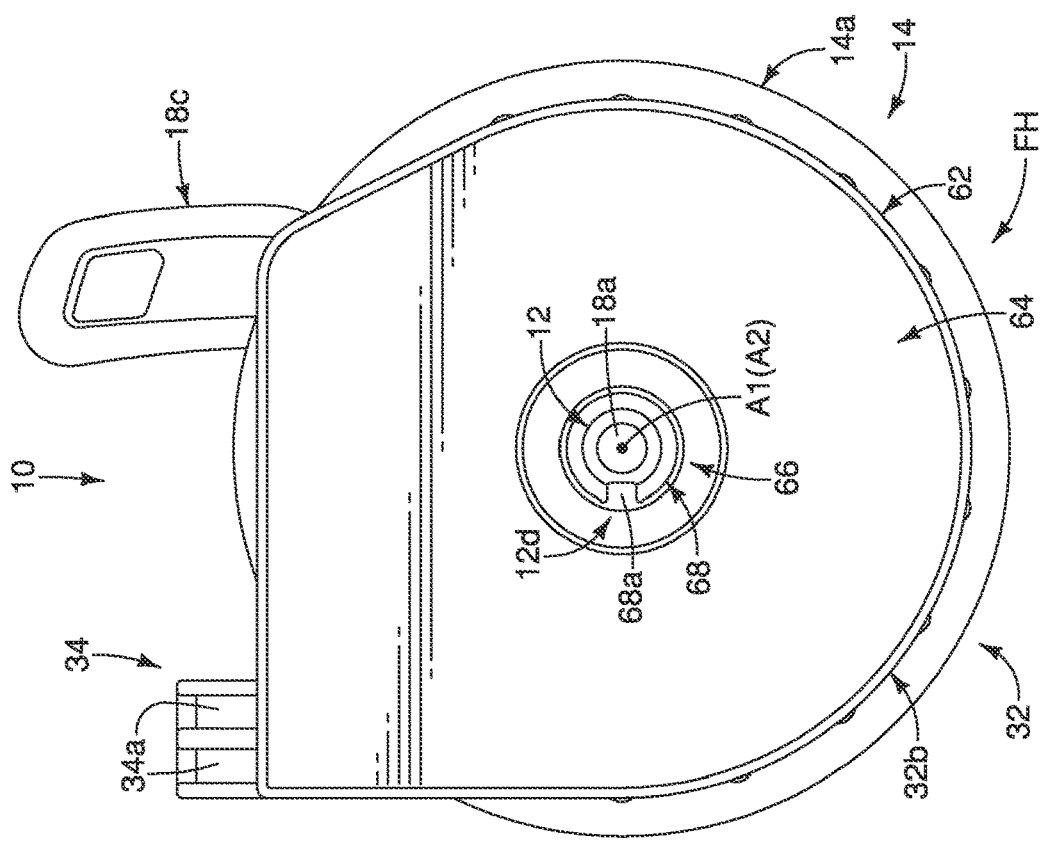
FIG. 13 is an outer side elevational view of the connector device disposed on the hub axle of the hub illustrated in FIGS. 2 to 5.

The second part 32b includes an outer peripheral portion 62 and an end wall portion 64. The second part 32b is attached to the first part 32a such that the outer peripheral portion 62 surrounds the stepped section 42f of the first part 32a. As seen in FIGS. 9 and 13, the end wall portion 64 has an overall shape that axially covers the entirety of the first part 32a, except for the electrical connector 34. The end wall portion 64 has a center opening 66 that has a center axis coincident with the center axis A2.

In the illustrated embodiment, the second part 32b is attached to the stepped section 42f of the first part 32a such that an outer peripheral surface of the outer peripheral portion 62 of the second part 32b lie in the same plane as an outer peripheral surface of the outer peripheral portion 42 of the first part 32a. As seen in FIG. 15, the first part 32a and the second part 32b are fastened together with a plurality of fasteners 68 (e.g., three screws). Of course, the first part 32a and the second part 32b can be fastened together with any other suitable manner, as needed and/or desired.

In the illustrated embodiment, the housing 32 further includes a third part 32c that is non-rotatably coupled to the first part 32a and the second part 32b. The third part 32c is provided to cover a recessed area of the first part 32a between the connecting portions 46 of the first part 32a. The housing 32 is non-rotatably coupled to the hub axle 12 by a washer 68. The washer 68 has a tab 68a that engages a groove 12d of the hub axle 12, and a plurality of projections 68b that engage a plurality of notches 66a in the second part 32b. Two additional washers 70 and 72 are also disposed in the housing 32 to support the housing 32 on the hub axle 12.

In the illustrated embodiment, the housing 32 is attached to the hub axle 12 in an orientation in which the second planar section 42c extends horizontally while the human-powered vehicle B is in an upright riding position on a horizontal surface. As seen in FIGS. 2, 11 and 12, the housing includes a first dimension or width W1 extending in the axial direction of the hub axle 12 and a second dimension or diameter D1 extending in the radial direction of the hub axle 12. In the illustrated embodiment, the first dimension W1 is measured parallel to the center axis A1 between outer facing surfaces of the end wall portions 44 and 64, while the second dimension D1 is measured perpendicular to the center axis A1 between an outer facing surface of the second planar section 42c to a lowermost point of the curved section 42a. In the illustrated embodiment, the first dimension W1 is smaller than the second dimension D1. Furthermore, the second dimension D1 is smaller than a diameter D2 of the hub body 14, which is a diameter of the first outer flange 14a or the second outer flange 14b.

Figure 14:
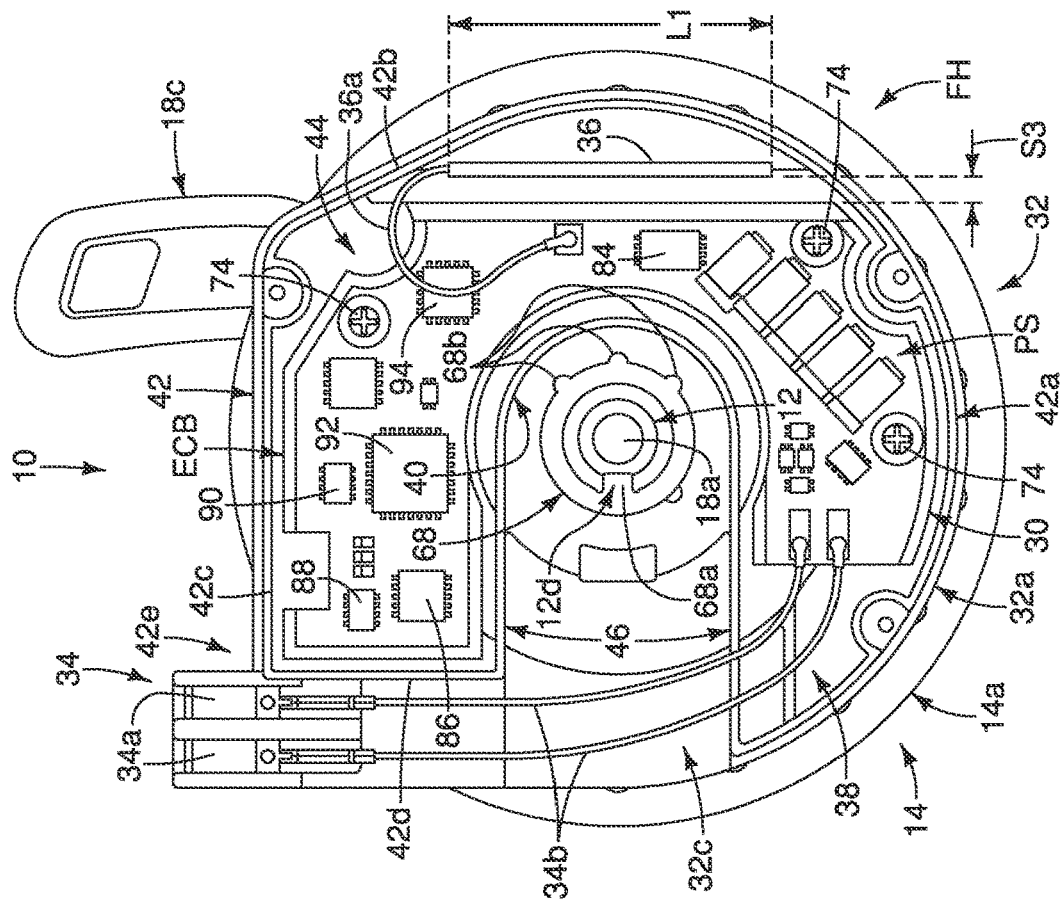
FIG. 14 is an outer side elevational view of the connector device disposed on the hub axle of the hub illustrated in FIGS. 2 to 5 in which a second part of a housing of the connector device has been removed.

As seen in FIGS. 14 and 15, the electronic circuit board ECB is disposed within the internal space 38 defined between the first part 32a and the second part 32b. In the illustrated embodiment, the electronic circuit board ECB is attached to the first part 32a by a plurality of fasteners 74 (e.g., three screws). The electronic circuit board ECB has an overall shape that correspond to the shape of the internal space 38. Specifically, the electronic circuit board ECB includes at least one arc shaped edge corresponding to an arc shaped surface of the inner peripheral portion 40 of the first part 32a of the housing 32. In particular, in the illustrated embodiment, the electronic circuit board ECB has a C-shape. However, the shape of the electronic circuit board ECB can be modified or changed as needed and/or desired. Also, in the illustrated embodiment, the electronic circuit board ECB is formed of a single part or substrate. However, the electronic circuit board ECB can be divided into a plurality of parts or substrates.

As seen in FIGS. 6, 14 and 15, the communication device 30 includes a power storage PS on the electronic circuit board ECB. The power storage PS is configured to store the electric power generated from the electric power generator 16. In particular, the power storage PS includes at least one capacitors and is electrically connected to the electric power generator 16 via a first electrical cable EC1 (FIG. 4) to receive the electric power generated from the electric power generator 16. Thus, in the illustrated embodiment, the power storage PS is provided separately from the electric power generator 16. However, alternatively, the power storage PS can be provided within the hub body 14 with the electric power generator 16. Also, the power storage PS can be partly provided with the electric power generator 16. In this case, the power storage PS can be formed by a plurality of power storages, part of which is provided on the electronic circuit board ECB and the rest of which is provided within the hub body 14 with the electric power generator 16. In the illustrated embodiment, as seen in FIG. 4, the first electrical cable EC1 is routed along a groove 12e of the hub axle 12 and extends between the electric power generator 16 and the electric circuit board ECB. In the illustrated embodiment, the power storage PS can rectify AC power supply from the electric power generator 16 to DC power supply, and can supply an output voltage of 5.0V. In the illustrated embodiment, the power storage PS is electrically connected to the electrical connector 34, and thus the power storage PS can supply the output voltage of 5.0V to the lamp LP via the electrical connector 34. Of course, the output voltage is not limited to this, and can be different from 5.0V as needed and/or desired.

Specifically, the electrical connector 34 has a pair of connection terminals 34a that are electrically connected to the electrical circuit board ECB via wires 34b. In the illustrated embodiment, as seen in FIG. 2, an end connector 76 that is electrically connected to the lamp LP via a second electrical cable EC2 is connected to the electrical connector 34 to supply the output voltage of 5.0V to the lamp LP from the power storage PS.

In the illustrated embodiment, the communication device 30 includes a detector 82 on the electronic circuit board ECB. Specifically, the detector 82 is configured to detect information relating to a riding condition of the human-powered vehicle B. In the illustrated embodiment, the detector 82 includes a rotation detection circuit 84 and a three-dimensional (3D) accelerometer 86. Thus, in the illustrated embodiment, the detector 82 includes at least one of the rotation detection circuit 84 (e.g., the speed detector) and the 3D accelerometer 86 (e.g., the acceleration detector).

The rotation detection circuit 84 is electrically connected to the electric power generator 16 to detect the rotation of the front wheel FW by detecting the frequency of the AC power supply from the electric power generator 16 or the rotational pulses of the electric power generator 16. Of course, the rotation detection circuit 84 can be different type of sensors for detecting the speed of the human-powered vehicle B. Specifically, in the illustrated embodiment, the rotation detection circuit 84 is provided separately from the electric power generator 16. However, the rotation detection circuit 84 can be a magnetic sensor that is configured to detect movement of the magnet 24 of the electric power generator 16. In this case, the rotation detection circuit 84 is provided with the electric power generator 16. Of course, alternatively, the rotation detection circuit 84 can be a set of a magnetic sensor that is provided separately from the electric power generator 16 and a magnet provided with the electric power generator 16. In this case, the rotation detection circuit 84 is provided only partially with the electric power generator 16.

The 3D accelerometer 86 detects movement or acceleration of the human-powered vehicle B in three dimensions. In the illustrated embodiment, the 3D accelerometer 86 is a mechanical accelerometer formed by a MEMS device. Of course, the 3D accelerometer 86 can be different type of sensors for detecting the movement or acceleration of the human-powered vehicle B. Furthermore, the 3D accelerometer 86 can be provided at any other suitable locations on the human-powered vehicle B.

In the illustrated embodiment, the detector 82 further includes a first low dropout regulator (LDO) 88 for 5.0V to 3.3V conversion and a second low dropout regulator (LDO) 90 for 5.0V to 1.8V conversion. With the first LDO 88 and the second LDO 90, the rotation detection circuit 84 can receive a voltage supply of 3.3V, while the 3D accelerometer 86 can receive voltage supplies of 3.3V and 1.8V.

In the illustrated embodiment, the communication device 30 includes an electric controller 92 on the electronic circuit board ECB. The electronic controller 92 includes at least one processor 92a that executes predetermined control programs. The at least one processor 92a can be, for example, a central processing unit (CPU) or a micro processing unit (MPU). The term "electronic controller" as used herein refers to hardware that executes a software program, and does not include a human. The electronic controller 92 further includes a memory 92b that stores various control programs and information used for various control processes. The memory 92b includes any computer storage device or any non-transitory computer-readable medium with the sole exception of a transitory, propagating signal. For example, the memory 92b includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM). Thus, in the illustrated embodiment, the electronic controller 92 is provided separately from the electric power generator 16. In the illustrated embodiment, the electronic controller 92 can also serve as a controller for the whole system of the human-powered vehicle B. However, alternatively, the controller for the whole system of the human-powered vehicle B can be provided at a different location of the human-powered vehicle B, such as at the operating device OD or the operated device TD.

In the illustrated embodiment, the communication device 30 includes a wireless communicator 94. The wireless communicator 94 is provided on the electronic circuit board ECB. In the illustrated embodiment, the wireless communicator 94 is a hardware device capable of transmitting and/or receiving an analog or digital signal wirelessly via the antenna 36. The terms "wireless communicator" as used herein include a receiver, a transmitter, a transceiver, a transmitter-receiver, and contemplates any device or devices, separate or combined, capable of transmitting and/or receiving wireless communication signals, including command or other signals related to some function of the operating device OD and the operated device TD being controlled. The wireless communication signals can be radio frequency (RF) signals having a frequency that is in a 2.4 GHz band or a 5.0 GHz band, ultra-wide band communication signals, or Bluetooth® communications or any other type of signal suitable for short range wireless communications as understood in the human-powered vehicle field. The wireless communicator 94 can be a one-way wireless communication device such as a receiver if information only needs to be wirelessly inputted from the operating device OD and the operated device TD. However, in the illustrated embodiment, the wireless communicator 94 is a two-way wireless communication device. Thus, in the illustrated embodiment, the wireless communicator 94 is configured to wirelessly communicate with the first and second wireless communicators WC1 and WC2 (e.g., the additional wireless communicators). In particular, the wireless communicator 94 is configured to at least one of wirelessly transmit a communication signal with the first and second wireless communicators WC1 and WC2 (e.g., the additional wireless communicators) and wirelessly receive the communication signal from the first and second wireless communicators WC1 and WC2 (e.g., the additional wireless communicator).

As seen in FIG. 6, the wireless communicator 94 is electrically connected to the power storage PS which is electrically connected to the electric power generator 16. Thus, in the illustrated embodiment, the communication device 30 includes the electrical circuit board ECB (e.g., the circuitry) electrically connected to the electric power generator 16 and the wireless communicator 94. Specifically, the wireless communicator 94 is electrically connected to the power storage PS to receive a voltage supply of 5.0V. Furthermore, the wireless communicator 94 is electrically connected to the detector 82. Specifically, the wireless communicator 94 is electrically connected to the rotation detection circuit 84 to receive an output pulse signal indicative of the speed of the human-powered vehicle B. Also, the wireless communicator 94 is electrically connected to the 3D accelerometer 86. In the illustrated embodiment, the wireless communicator 94 can communicate with the 3D accelerometer 86 using the serial peripheral interface (SPI), and receive an output signal indicative of the movement or acceleration of the human-powered vehicle B.

Furthermore, in the illustrated embodiment, the wireless communicator 94 is electrically connected to the electric controller 92 configured to control at least one of the operating device OD and the operated device TD according to at least one of the communication signal related to the communication device 30 and the information detected by the detector 82. Specifically, in the illustrated embodiment, the wireless communicator 94 communicates with the first and second wireless communicators WC1 and WC2 to transmit and/or receive wireless communication signals, including command or other signals related to some function of the operating device OD and the operated device TD being controlled by the electric controller 92.

In some cases, the wireless communicator 94 can also support Bluetooth® 5.1 for Vehicle-to-everything (V2X) communication. In this case, the wireless communicator 94 can broadcast the wireless communication signal including the information indicative of the speed of the human-powered vehicle B detected by the rotation detection circuit 84 and the movement or acceleration of the human-powered vehicle B detected by the 3D accelerometer 86. This broadcast communication signal can be received by a roadway receiver, such as a BLE5.1 receiver, which is installed on a roadway infrastructure, such as a smart pole, and can be delivered to other vehicles such that other vehicles can receive information relating to the human-powered vehicle B, such as a type of vehicle, a position, a speed, a heading, etc. Thus, in the illustrated embodiment, the wireless communicator 94 is configured to wirelessly transmit a communication signal with the roadway receiver (e.g., the additional wireless communicator).

In the illustrated embodiment, the communication device 30 includes the antenna 36 configured to be connected to the wireless communicator 94. Specifically, the antenna 36 is connected to the wireless communicator 94 to transmit and/or receive the wireless communication signal. As seen in FIGS. 14 and 15, the antenna 36 is provided separately from the electrical circuit board ECB (e.g., the circuitry). In other words, the antenna 36 is provided separately from the wireless communicator 94 on the electrical circuit board ECB. Specifically, the antenna 36 is electrically connected to the electrical circuit board ECB via an antenna feed or cable 36a. In the illustrated embodiment, the antenna 36 is disposed within the internal space 38 of the housing 32.

Specifically, in the illustrated embodiment, the antenna 36 includes a monopole antenna. The antenna 36 is made of a metal plate. The antenna 36 is dimensioned such that the antenna 36 can be installed within the internal space 38 of the housing 32 with sufficient clearance from adjacent conducting material. Specifically, as seen in FIG. 14, the antenna 36 is disposed spaced apart from the electrical circuit board ECB with a spacing S3 therebetween. In the illustrated embodiment, the antenna 36 preferably has a length L1 smaller than 35 mm. Also, the spacing S3 is preferably greater than 5 mm.

Furthermore, in the illustrated embodiment, the antenna 36 is configured and arranged to have a suitable directivity for communicating with the first and second wireless communicators WC1 and WC2 or the roadway receiver. Specifically, in the illustrated embodiment, the antenna 36 is preferably configured and arranged such that the envelope of the antenna 36 has a vertical power beamwidth, such as the half power beamwidth or 3 dB beamwidth, of at least 90 degrees between a forward direction of the human-powered vehicle B and a vertically upward direction in the vertical plane and a horizontal power beam width, such as the half power beamwidth or 3 dB beamwidth, of at least 180 degrees between a laterally rightward direction of the human-powered vehicle B and a laterally leftward direction of the human-powered vehicle B in the forward direction in the horizontal plane while the human-powered vehicle B is in an upright riding position on a horizontal surface.

Preferably, in the illustrated embodiment, the antenna 36 is in an upright orientation such that a longitudinal direction of the antenna 36 is aligned with the vertical direction while the human-powered vehicle B is in an upright riding position on a horizontal surface, and has an omnidirectional radiation pattern in the horizontal plane. Furthermore, in the illustrated embodiment, for the purpose of the V2X communication, the antenna 36 is preferably configured to be able to communicate with the roadway receiver that is located 40 meters away from the human-powered vehicle B.

Figure 16:
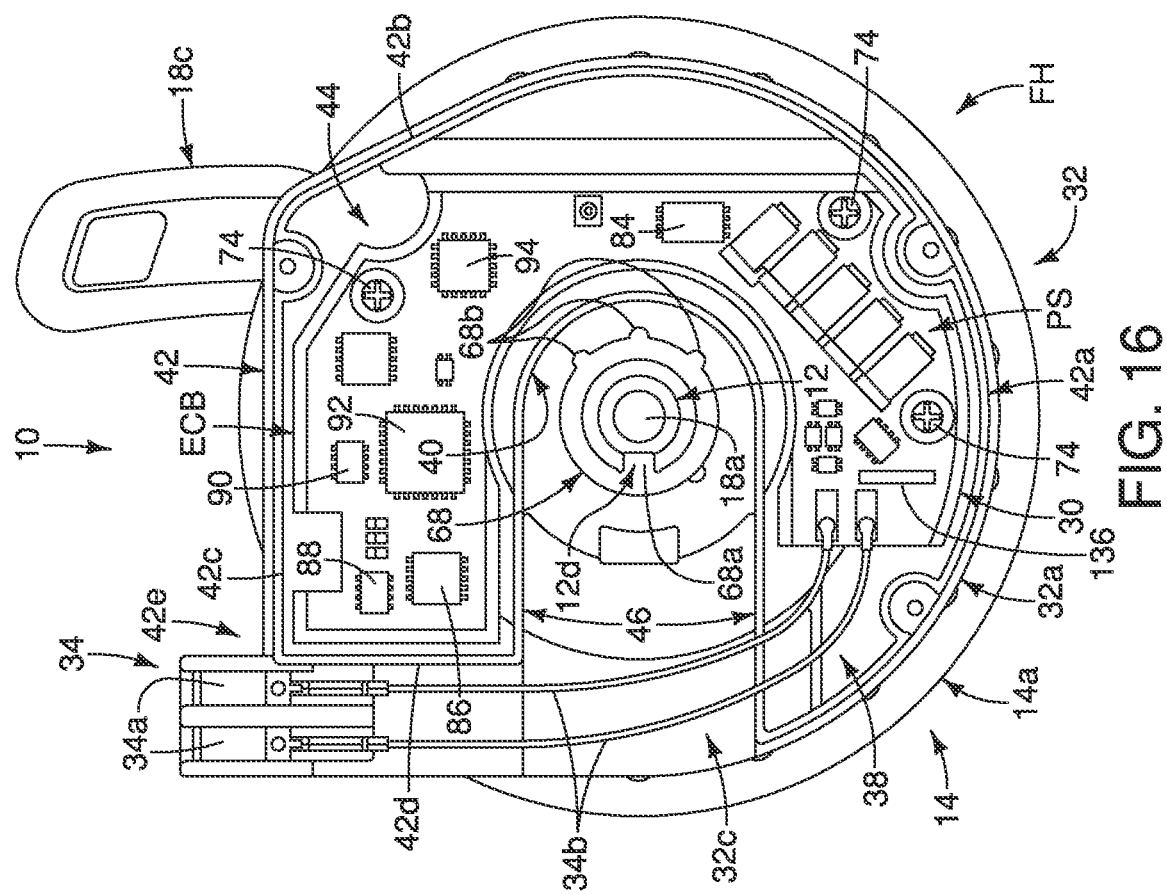
FIG. 16 is an outer side elevational view of an alternate embodiment of a connector device disposed on the hub axle of the hub illustrated in FIGS. 2 to 5 in which a second part of a housing of the connector device has been removed.

In the illustrated embodiment, as seen in FIGS. 14 and 15, the antenna 36 is provided separately from the electrical circuit board ECB. However, the antenna 36 can be provided in a different location. Specifically, as seen in FIG. 16, a connector device 110 is provided to the front hub FH. The connector device 110 is basically functionally identical to the connector device 10, except for that an antenna 136 is disposed on the electrical circuit board ECB. In other words, the antenna 136 can be integrated to the electrical circuit board ECB (e.g., the circuitry). In this case, the antenna 136 can include a chip antenna or a patch antenna that can be mounted on the electrical circuit board ECB. Thus, in this case, the antenna 136 is provided with the wireless communicator 94 on the electrical circuit board ECB. Of course, alternatively, the antenna 136 can be provided only partially with the wireless communicator 94 on the electrical circuit board ECB.

Figure 17:
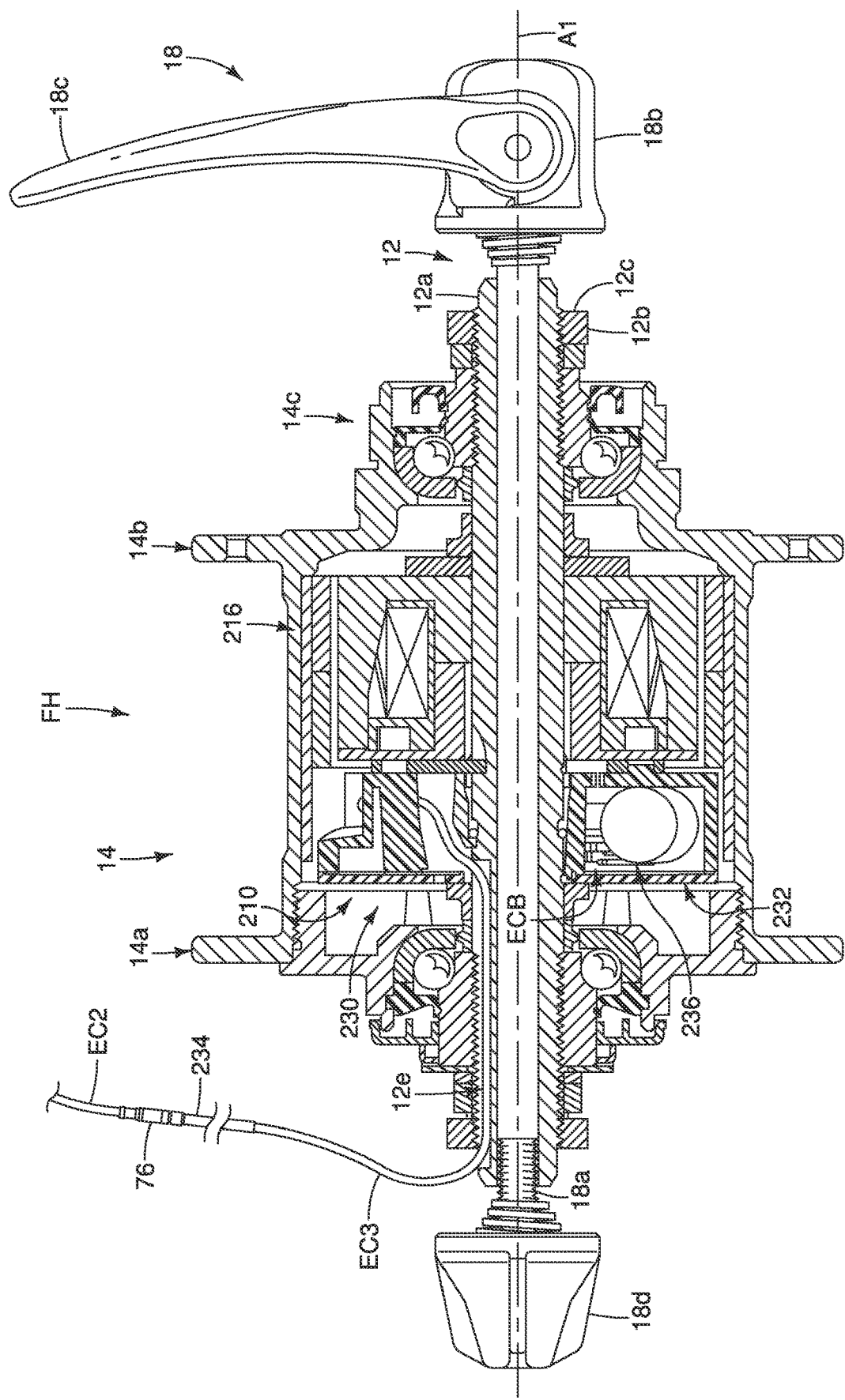
FIG. 17 is a longitudinal cross-sectional view of an alternate embodiment of a hub in which a connector device is at least partly integrate with a hub body.

In the illustrated embodiment, as seen in FIG. 4, the housing 32 is provided to the hub axel 12 and is provided separately from the hub body 14. However, the housing 32 can be provided in a different location and/or different manner. Specifically, as seen in FIG. 17, a connector device 210 is provided to the front hub FH. The connector device 210 is basically functionally identical to the connector device 10, except for that the connector device 210 is dimensioned to be disposed inside the hub body 14. Specifically, as seen in FIG. 17, the connector device 210 includes a communication device 230 and an internal housing 232 that accommodates the communication device 230. The internal housing 232 is disposed inside the hub body 14. Thus, the internal housing 232 (e.g., the housing) is provided to the hub body 14. In particular, as seen in FIG. 17, an electric power generator 216 that is basically functionally identical to the electric power generator 16 has a smaller axial dimension than the electric power generator 16 to make a room inside the hub body 14 in which the internal housing 232 is disposed. In this case, the electric circuit board ECB and an antenna 236 of the communication device 230 are also resized to fit inside the internal housing 232. Further, in this case, the antenna 236 can be provided separately from the electrical circuit board ECB, as seen in FIGS. 14 and 15, or can be disposed on the electrical circuit board ECB, as seen in FIG. 16. Thus, in the illustrated embodiment, as seen in FIG. 17, the internal housing 232 (e.g., the housing) at least partly overlaps with the hub body 14 as viewed perpendicular to the rotational axis A1. Furthermore, in this case, the hub body 14 itself serves as a housing that accommodates the communication device 230. Thus, in the illustrated embodiment, the housing that accommodates the communication device 230 is at least partly integrated with the hub body 14. Also, in this case, the electric circuit board ECB is provided within the hub body 14 with the electric power generator 216. Thus, in the illustrated embodiment, an electronic controller of the electric circuit board ECB is provided within the hub body 14 with the electric power generator 216. Furthermore, the electronic controller can be formed by a plurality of processors, part of which is provided on the electric circuit board ECB within the hub body 14 with the electric power generator 216 and the rest of which is provided outside the hub body 14.

As also seen in FIG. 17, an electrical connector 234 is provided separately from the internal housing 232. Specifically, the electrical connector 234 is disposed outside the hub body 14 and is electrically connected to the electric circuit board ECB via a third electrical cable EC3. The third electrical cable EC3 is routed from the electric circuit board ECB along the groove 12e of the hub axle 12 and extends outside the hub body 14. Also, in this case, the antenna 236 can be provided separately from the internal housing 232. Specifically, the antenna feed or cable can be routed from the electric circuit board ECB along the groove 12e of the hub axle 12 and extend outside the hub body 14.

Figure 18:
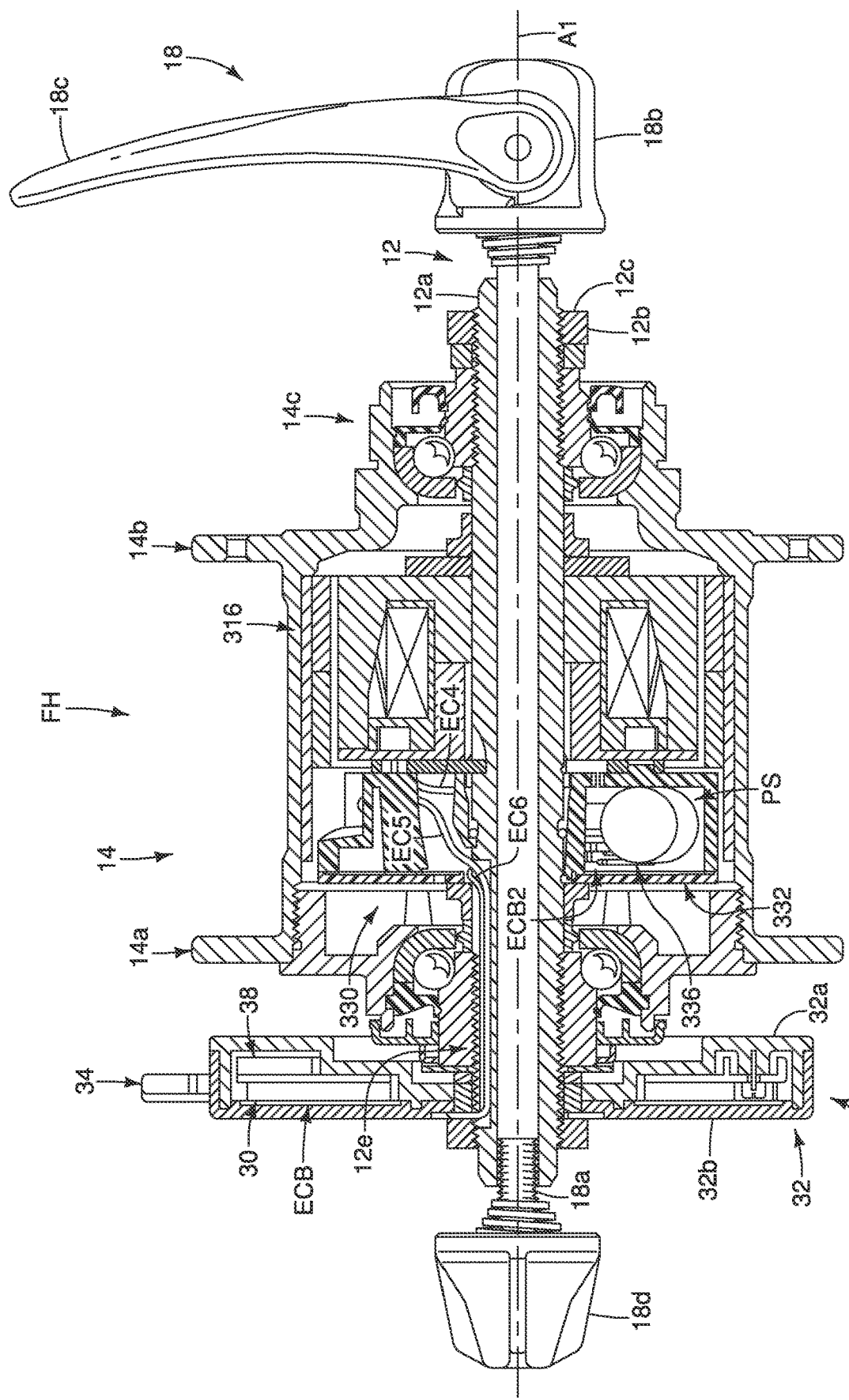
FIG. 18 is a longitudinal cross-sectional view of an alternate embodiment of a hub in which an antenna and a power storage are disposed within a hub body.

Furthermore, in accordance with an alternate embodiment, some components of the communication device 30 shown in FIG. 4 can be disposed within the hub body 14. Specifically, as seen in FIG. 18, a connector device 310 is provided to the front hub FH. The connector device 310 is basically functionally identical to the connector device 10, except for that the connector device 310 further includes an interior unit 330 that is dimensioned to be disposed inside the hub body 14. Specifically, as seen in FIG. 18, the connector device 310 includes the communication device 30 and the housing 32 that is disposed outside of the hub body 14 and accommodates the communication device 30, as the connector device 10 shown in FIG. 4. In the illustrated embodiment, the connector device 310 further includes the interior unit 330 having an electric circuit board ECB2 and an internal housing 332 that houses the electric circuit board ECB2.

The internal housing 332 is disposed inside the hub body 14. Thus, the internal housing 332 (e.g., the housing) is provided to the hub body 14. In particular, as seen in FIG. 18, an electric power generator 316 that is basically functionally identical to the electric power generator 16 has a smaller axial dimension than the electric power generator 16 to make a room inside the hub body 14 in which the internal housing 332 is disposed. In the illustrated embodiment, the connector device 310 also includes an antenna 336 within the internal housing 332, instead of having the antenna 36 within the housing 32. In particular, in the illustrated embodiment, the antenna 336 is disposed on the electric circuit board ECB2 within the internal housing 332. The antenna 336 can be the same type of antenna as the antenna 136 shown in FIG. 16. Furthermore, in the illustrated embodiment, the connector device 310 also includes a power supply or storage PS within the internal housing 332. In particular, in the illustrated embodiment, the power storage PS is disposed on the electric circuit board ECB2 within the internal housing 332, and is electrically connected to the electric power generator 316 to receive the electric power from the electric power generator 316 via a fourth electric cable EC4 that electrically connects the electric power generator 316 and the electric circuit board ECB2.

As also seen in FIG. 18, the electric circuit board ECB2 within the internal housing 332 is electrically connected to the electric circuit board ECB within the housing 32 via fifth and sixth electrical cables EC5 and EC6 that are routed through the groove 12e of the hub axle 12. Specifically, in the illustrated embodiment, the electric circuit board ECB is electrically connected to the electric circuit board ECB2 via the electrical cable EC4 to receive the electrical power from the power storage PS on the electric circuit board ECB2. Furthermore, in the illustrated embodiment, the antenna 336 disposed on the electric circuit board ECB2 is electrically connected to the electric circuit board ECB (e.g., the wireless communicator 94 shown in FIG. 6) via the sixth electrical cable EC6, which serves as an antenna feed or cable. Thus, in the illustrated embodiment, the power storage PS and the antenna 336 are provided separately from the communication device 30 and disposed within the hub body 14.

Figure 19:
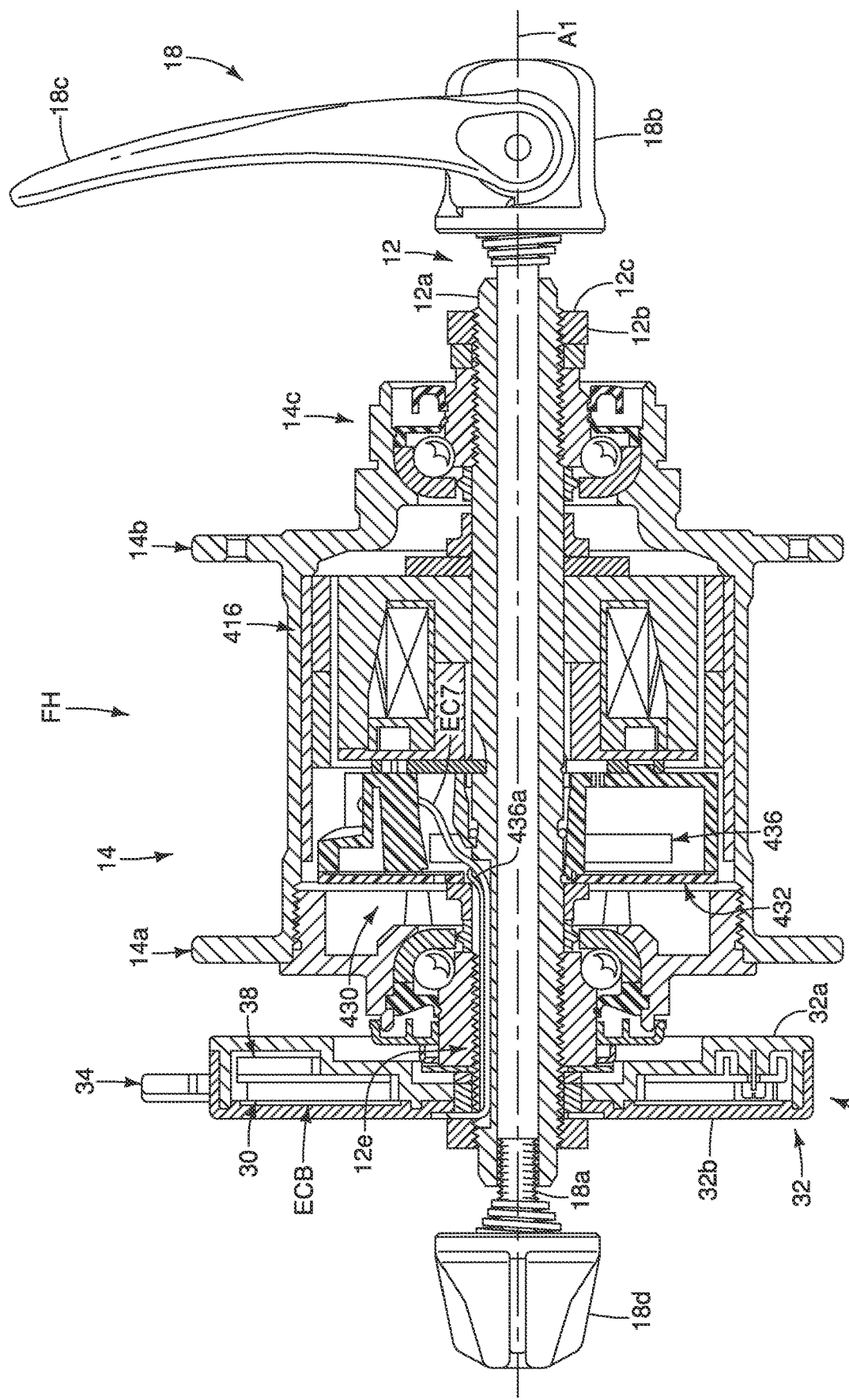
FIG. 19 is a longitudinal cross-sectional view of an alternate embodiment of a hub in which an antenna is disposed within a hub body.

Furthermore, in accordance with an alternate embodiment, some components of the communication device 30 shown in FIG. 4 can be disposed within the hub body 14. Specifically, as seen in FIG. 19, a connector device 410 is provided to the front hub FH. The connector device 410 is basically functionally identical to the connector device 10, except for that the connector device 410 further includes an interior unit 430 that is dimensioned to be disposed inside the hub body 14. Specifically, as seen in FIG. 19, the connector device 410 includes the communication device 30 and the housing 32 that is disposed outside of the hub body 14 and accommodates the communication device 30, as the connector device 10 shown in FIG. 4. In the illustrated embodiment, the connector device 410 further includes the interior unit 430 having an antenna 436 and an internal housing 432 that houses the antenna 436.

The internal housing 432 is disposed inside the hub body 14. Thus, the internal housing 432 (e.g., the housing) is provided to the hub body 14. In particular, as seen in FIG. 19, an electric power generator 416 that is basically functionally identical to the electric power generator 16 has a smaller axial dimension than the electric power generator 16 to make a room inside the hub body 14 in which the internal housing 432 is disposed. In the illustrated embodiment, the connector device 410 includes the antenna 436 within the internal housing 432, instead of having the antenna 36 within the housing 32. In particular, in the illustrated embodiment, the antenna 436 is disposed within the internal housing 432 and is electrically connected to the electrical circuit board ECB (e.g., the wireless communicator 94 shown in FIG. 6) via an antenna feed or cable 436a that is routed through the groove 12e of the hub axel 12. Furthermore, in the illustrated embodiment, the electrical circuit board ECB is electrically connected to the electric power generator 416 to receive the electric power from the electric power generator 416 via a seventh electric cable EC7. Thus, in the illustrated embodiment, the antenna 436 is provided separately from the communication device 30 and disposed within the hub body 14.

Figure 20:
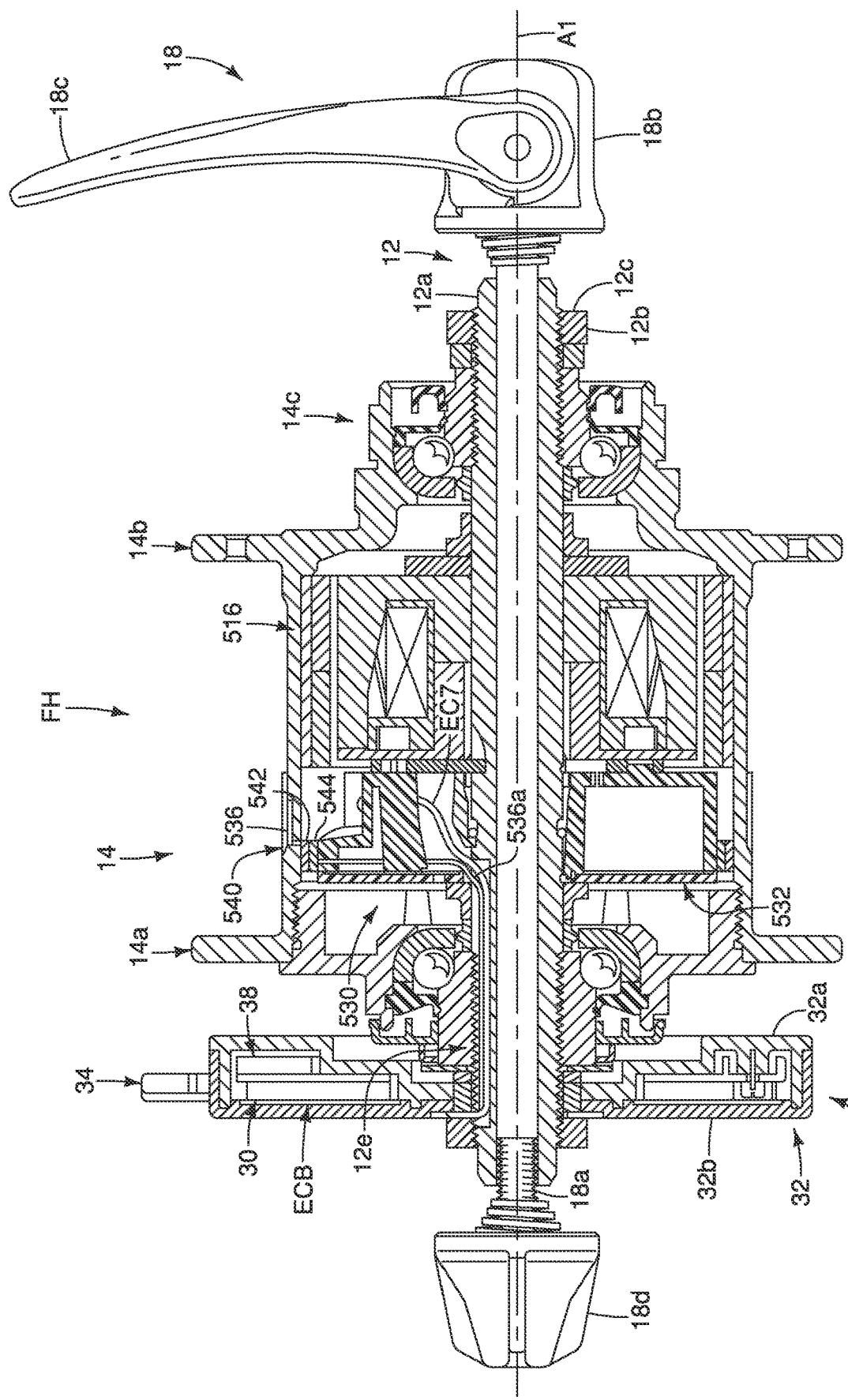
FIG. 20 is a longitudinal cross-sectional view of an alternate embodiment of a hub in which an antenna is disposed around a hub body.

Furthermore, in accordance with an alternate embodiment, some components of the communication device 30 shown in FIG. 4 can be disposed on the hub body 14. Specifically, as seen in FIG. 20, a connector device 510 is provided to the front hub FH. The connector device 510 is basically functionally identical to the connector device 10, except for that the connector device 510 further includes an interior or remote unit 530 that is dimensioned to be disposed inside the hub body 14 and an accommodating part 540 that is disposed around an outer surface of the hub body 14 as a part of the hub body 14. Specifically, as seen in FIG. 20, the connector device 510 includes the communication device 30 and the housing 32 that is disposed outside of the hub body 14 and accommodates the communication device 30, as the connector device 10 shown in FIG. 4. In the illustrated embodiment, the connector device 510 further includes the interior unit 530 having an internal housing 532 and the accommodating part 540 that accommodates an antenna 536 such that the antenna 536 is disposed around the outer surface of the hub body 14.

Specifically, in the illustrated embodiment, the internal housing 532 is disposed inside the hub body 14. Thus, the internal housing 532 (e.g., the housing) is provided to the hub body 14. In particular, as seen in FIG. 20, an electric power generator 516 that is basically functionally identical to the electric power generator 16 has a smaller axial dimension than the electric power generator 16 to make a room inside the hub body 14 in which the internal housing 532 is disposed. In the illustrated embodiment, the electrical circuit board ECB is electrically connected to the electric power generator 516 to receive the electric power from the electric power generator 516 via the seventh electric cable EC7. Thus, in the illustrated embodiment, the antenna 536 is provided separately from the communication device 30.

In the illustrated embodiment, the connector device 510 includes the antenna 536 disposed on the hub body 14, instead of having the antenna 36 within the housing 32. In particular, in the illustrated embodiment of FIG. 20, the hub body 14 is provided with the accommodating part 540 that accommodates the antenna 536. The accommodating part 540 includes a non-metallic portion that covers the antenna 536. Specifically, the non-metallic portion is formed of a resin material to avoid communication interference of the antenna 536.

The antenna 536 is electrically connected to the circuitry of the electrical circuit board ECB disposed within the housing 32 via an antenna feed or cable 536a that is routed through the groove 12e of the hub axel 12. Furthermore, the antenna 536 is electrically connected to the antenna feed 536a by using a mechanical connection with a brush 542 and a resistor 544. Specifically, the brush 542 is provided to one of a rotating part and a stationary part of the front hub FH, while the resistor 544 is provided to the other one of the rotating part and the stationary part of the front hub FH. In the illustrated embodiment, the accommodating part 540 is provided with the brush 542 and the internal housing 532 is provided with the resistor 544. The brush 542 is also connected to the antenna 536 via a cable extends through a communication hole provided to the hub body 14, and the resistor 544 is connected to the antenna feed 536a that is also electrically connected to the circuitry of the electrical circuit board ECB. Thus, as the hub body 14 rotates, the accommodating part 540 rotates relative the electrical circuit board ECB and the internal housing 532, and the brush 542 remains in contact with the resistor 544 so that the antenna 536 remains electrically connected to the circuitry of the electrical circuit board ECB. Alternatively, the accommodating part 540 and the electrical circuit board ECB can each include a short-range wireless communicator to transmit signals between the antenna 536 and the electrical circuit board ECB.

Furthermore, with the configuration shown in FIG. 17, the antenna 236 can also be disposed around the hub body 14 and separately from the electrical circuit board ECB. In this case, the antenna 236 can be similarly provided on the hub body 14 as the antenna 536 shown in FIG. 20, and be electrically connected to the electrical circuit board ECB disposed within the internal housing 232 by using the mechanical connection with the brush and the resistor, as shown in FIG. 20. Similarly, with the configuration shown in FIG. 18, the antenna 336 can also be disposed around the hub body 14 and separately from the electrical circuit board ECB2. In this case, the antenna 336 can be similarly provided on the hub body 14 as the antenna 536 shown in FIG. 20, and be electrically connected to the electrical circuit board ECB2 disposed within the internal housing 332 by using the mechanical connection with the brush and the resistor, as shown in FIG. 20.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub. Accordingly, these directional terms, as utilized to describe the hub should be interpreted relative to a human-powered vehicle (e.g., bicycle) in an upright riding position on a horizontal surface and that is equipped with the hub. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub for a human-powered vehicle, the hub comprising:
    a hub axle;
    a hub body rotatably mounted on the hub axle about a rotational axis;
    an electric power generator provided between the hub axle and the hub body, the electric power generator configured to generate electric power by relative rotation between hub axle and the hub body; and
    a communication device located at least partly outside of the hub body, the communication device including a wireless communicator configured to wirelessly communicate with an additional wireless communicator and an antenna configured to be connected to the wireless communicator; and
    a housing provided to one of the hub axle and the hub body, the housing including an axle receiving opening through which the hub axle extends and entirely accommodating the antenna of the communication device within an internal space thereof.

2. The hub according to claim 1, wherein
the housing is non-rotatably coupled to the hub axle.

3. The hub according to claim 2, wherein
the housing includes a first dimension extending in an axial direction of the hub axle and a second dimension extending in a radial direction of the hub axle, the first dimension being smaller than the second dimension.

4. The hub according to claim 3, wherein
the housing is provided separately from the hub body.

5. The hub according to claim 2, wherein
the housing includes an electrical connector configured to be connected to an additional component.

6. The hub according to claim 2, wherein
the housing includes a first part and a second part that are coupled to each other.

7. The hub according to claim 1, wherein
the communication device includes a circuitry electrically connected to the antenna.

8. The hub according to claim 7, wherein
the antenna is provided separately from the circuitry.

9. The hub according to claim 7, wherein
the antenna is integrated to the circuitry.

10. The hub according to claim 1, wherein
the wireless communicator is electrically connected to a detector, the detector being configured to detect information relating to a riding condition of the human-powered vehicle.

11. The hub according to claim 10, wherein
the detector includes at least one of a speed detector and an acceleration detector.

12. The hub according to claim 1, wherein
the housing at least partly overlaps with the hub body as viewed perpendicular to the rotational axis.

13. The hub according to claim 12, wherein
the housing is at least partly integrated with the hub body.

14. The hub according to claim 1, wherein
the antenna includes a monopole antenna.

15. The hub according to claim 1, wherein
the communication device includes a circuitry electrically connected to the electric power generator and the wireless communicator.

16. The hub according to claim 1, wherein
the wireless communicator is electrically connected to a power storage which is electrically connected to the electric power generator, the power storage configured to store the electric power generated from the electric power generator.

17. The hub according to claim 1, wherein
the wireless communicator is electrically connected to a controller configured to control at least one of an operating device and an operated device according to at least one of a communication signal related to the communication device and information detected by a detector.

* * * * *